United States Patent
Demir et al.

(10) Patent No.: US 12,471,044 B2
(45) Date of Patent: Nov. 11, 2025

(54) IN-CHANNEL NARROWBAND COMPANION AIR-INTERFACE ASSISTED WIDEBAND RACH PROCEDURES

(71) Applicant: INTERDIGITAL PATENT HOLDINGS, INC., Wilmington, DE (US)

(72) Inventors: Alpaslan Demir, East Meadow, NY (US); Sanjay Goyal, Deer Park, NY (US); Hussain Elkotby, Conshohocken, PA (US); Tanbir Haque, Jackson Heights, NY (US); Ravikumar Pragada, Warrington, PA (US); Patrick Cabrol, Bayshore, NY (US); Mihaela Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 240 days.

(21) Appl. No.: 18/267,273

(22) PCT Filed: Dec. 16, 2021

(86) PCT No.: PCT/US2021/063863
§ 371 (c)(1),
(2) Date: Jun. 14, 2023

(87) PCT Pub. No.: WO2022/133119
PCT Pub. Date: Jun. 23, 2022

(65) Prior Publication Data
US 2024/0064818 A1     Feb. 22, 2024

Related U.S. Application Data
(60) Provisional application No. 63/126,401, filed on Dec. 16, 2020.

(51) Int. Cl.
*H04W 74/00* (2009.01)
*H04W 56/00* (2009.01)
(Continued)

(52) U.S. Cl.
CPC ..... *H04W 56/001* (2013.01); *H04W 74/0833* (2013.01); *H04W 74/0836* (2024.01); *H04W 74/0838* (2024.01)

(58) Field of Classification Search
CPC .......... H04W 56/001; H04W 74/0833; H04W 74/0836; H04W 74/0838; H04W 52/0232; Y02D 30/70
See application file for complete search history.

(56) References Cited

U.S. PATENT DOCUMENTS

| 2015/0282052 A1* | 10/2015 | Wallen | H04J 11/0086 455/434 |
| --- | --- | --- | --- |
| 2018/0049245 A1* | 2/2018 | Islam | H04W 72/02 |
| 2019/0104459 A1* | 4/2019 | Su | H04L 1/0025 |

OTHER PUBLICATIONS

Abdo et al., "A 300GHz Dielectric Lens Antenna," 12th Global Symposium on Millimeter Waves, pp. 17-19 (May 2019).
(Continued)

*Primary Examiner* — Lakeram Jangbahadur
(74) *Attorney, Agent, or Firm* — Volpe Koenig

(57) ABSTRACT

Methods, systems, and devices for in-channel narrowband (NB) companion air interface (CAI) assisted wideband (WB) random access channel (RACH) access. Periodic NB downlink (DL) synchronization sequences are detected. Range information is estimated by measuring the periodic NB DL synchronization sequences; and determining an NB CAI RACH occasion. The range information is transmitted to a gNode B (gNB), or other base station, in a NB CAI RACH procedure. At least one selected WB sequence based on the range information and at least one scheduled WB RACH occasion based on the NB CAI RACH occasion are
(Continued)

received from the gNB. A contention free WB RACH procedure is performed based on the received at least one selected WB sequence and the at least one scheduled WB RACH occasion.

20 Claims, 24 Drawing Sheets

(51) Int. Cl.
 *H04W 74/0833* (2024.01)
 *H04W 74/0836* (2024.01)
 *H04W 74/0838* (2024.01)

(56) References Cited

OTHER PUBLICATIONS

Boronin et al., "Capacity and throughput analysis of nanoscale machine communication through transparency windows in the terahertz band," Nano Communication Networks, pp. 72-82 (2014).
Dan et al., "A 300GHz Down-Converter S-MMIC for Future Terahertz Communication," IEEE Conference on Microwaves, Antennas, Communications and Electronic Systems (2019).
Federal Communications Commission, In the Matter of Spectrum Horizons et al., Notice of Proposed Rulemaking and Order, FCC 18-17 (Feb. 2018).
Han et al., "Multi-Ray Channel Modeling and Wideband Characterization for Wireless Communications in the Terahertz Band," IEEE Transactions on Wireless Communications, vol. 14, No. 5, pp. 2402-2412 (May 2015).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology - Telecommunications and information exchange between systems - Local and metropolitan area networks - Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Leuther et al., "35 nm mHEMT Technology for THz and ultra-low noise applications," International Conference on Indium Phosphide and Related Materials, Kobe, Japan (May 2013).
Lofti et al., "An UWB 18.5 GS/s Sampling Front-End for a 74 GS/s 5-bit ADC in 22 nm FDSOI,".
Petrov et al., "Terahertz Band Communications: Applications, Research Challenges, and Standardization Activities," 8th International Congress on Ultra Modern Telecommunications and Control Systems and Workshops (2016).
Rafique et al., "A 4.6V, 6-bit, 64GS/s Transmitter in 22nm FDSOI CMOS," IEEE BCICTS (2019).
Schmalz et al., "A 245 GHZ Transmitter in SiGe Technology," IEEE Radio Frequency Integrated Circuits Symposium, pp. 195-198 (2012).
Schoch et al., "300 GHz broadband power amplifier with 508 GHz gain-bandwidth product and 8 dBm output power," IEEE IMS (2019).
Sural et al., "Terabits-per-Second Throughput for Polar Codes," 2019 IEEE 30th Annual International Symposium on Personal, Indoor and Mobile Radio Communications Workshops (2019).

\* cited by examiner

IN-CHANNEL NARROWBAND COMPANION AIR-INTERFACE ASSISTED WIDEBAND RACH PROCEDURES

CROSS-REFERENCE TO RELATED APPLICATIONS

This application is the U.S. National Stage, under 35 U.S.C. § 371, of International Application No. PCT/US2021/063863 filed Dec. 16, 2021, which claims the benefit of U.S. Provisional Application No. 63/126,401, filed Dec. 16, 2020, the contents of which are incorporated herein by reference.

BACKGROUND

In highly directional systems where large bandwidth utilization is required, the transmit and receive power for a radio that includes a radio front end and signal processing blocks is typically very high, in order to achieve high data rates.

SUMMARY

Some embodiments provide methods, systems, and devices for in-channel narrowband (NB) companion air interface (CAI) assisted wideband (WB) random access channel (RACH) access. Periodic NB downlink (DL) synchronization sequences are detected. Range information is estimated by measuring the periodic NB DL synchronization sequences; and determining an NB CAI RACH occasion. The range information is transmitted to a gNode B (gNB), or other base station, in a NB CAI RACH procedure. At least one selected WB sequence based on the range information and at least one scheduled WB RACH occasion based on the NB CAI RACH occasion are received from the gNB. A contention free WB RACH procedure is performed based on the received at least one selected WB sequence and the at least one scheduled WB RACH occasion.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

In order to save power, a companion air interface (CAI) is provided, which operates in conjunction with the main or primary air interface. The CAI may consume less power than the main air interface. For example, some implementations provide an in-channel NB CAI, where a WB main air interface is operational only when it is activated. In some cases, this results in the WB transceiver not consuming energy, or consuming less energy, in an inactive mode. In some implementations, the NB CAI radio link is used for control plane and small data exchange (i.e., exchange of packets below a threshold packet size, or exchange of packets which include less than a threshold amount of data), and the WB main radio link is enabled only for relatively faster (e.g., above a threshold) data rates and/or the exchange of relatively larger (e.g., above a threshold) amounts of data.

Figure 1A:
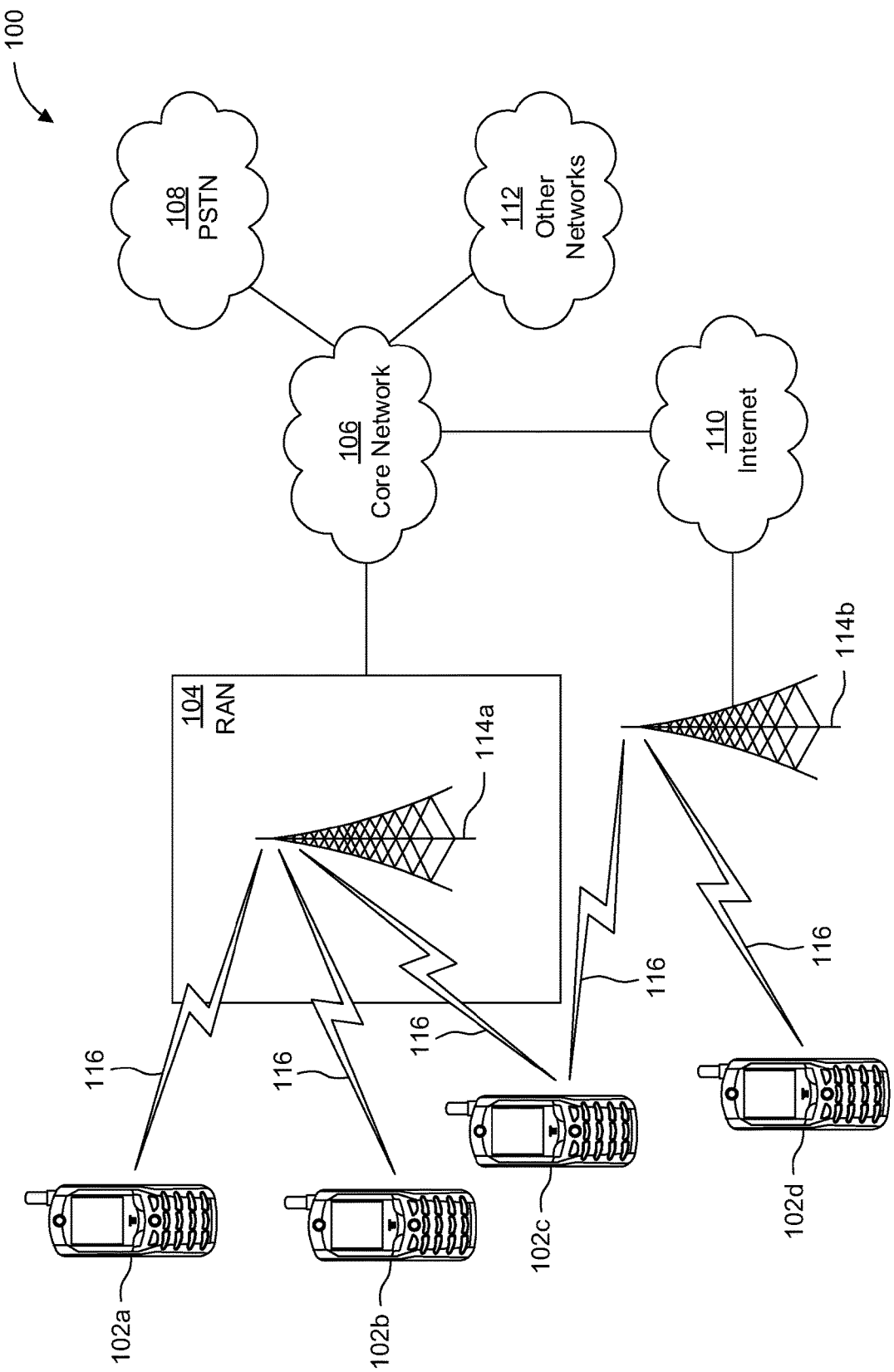
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
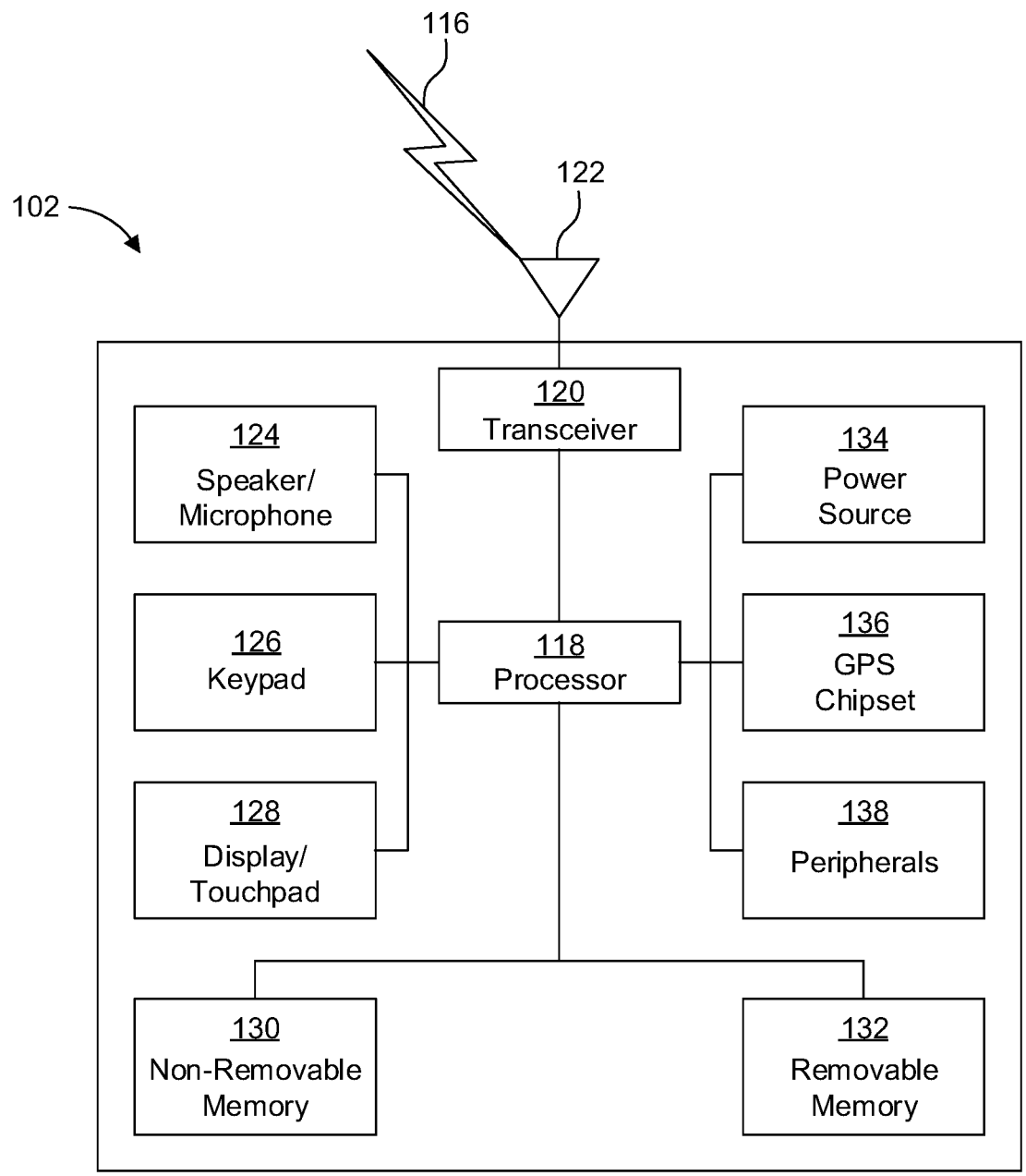
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
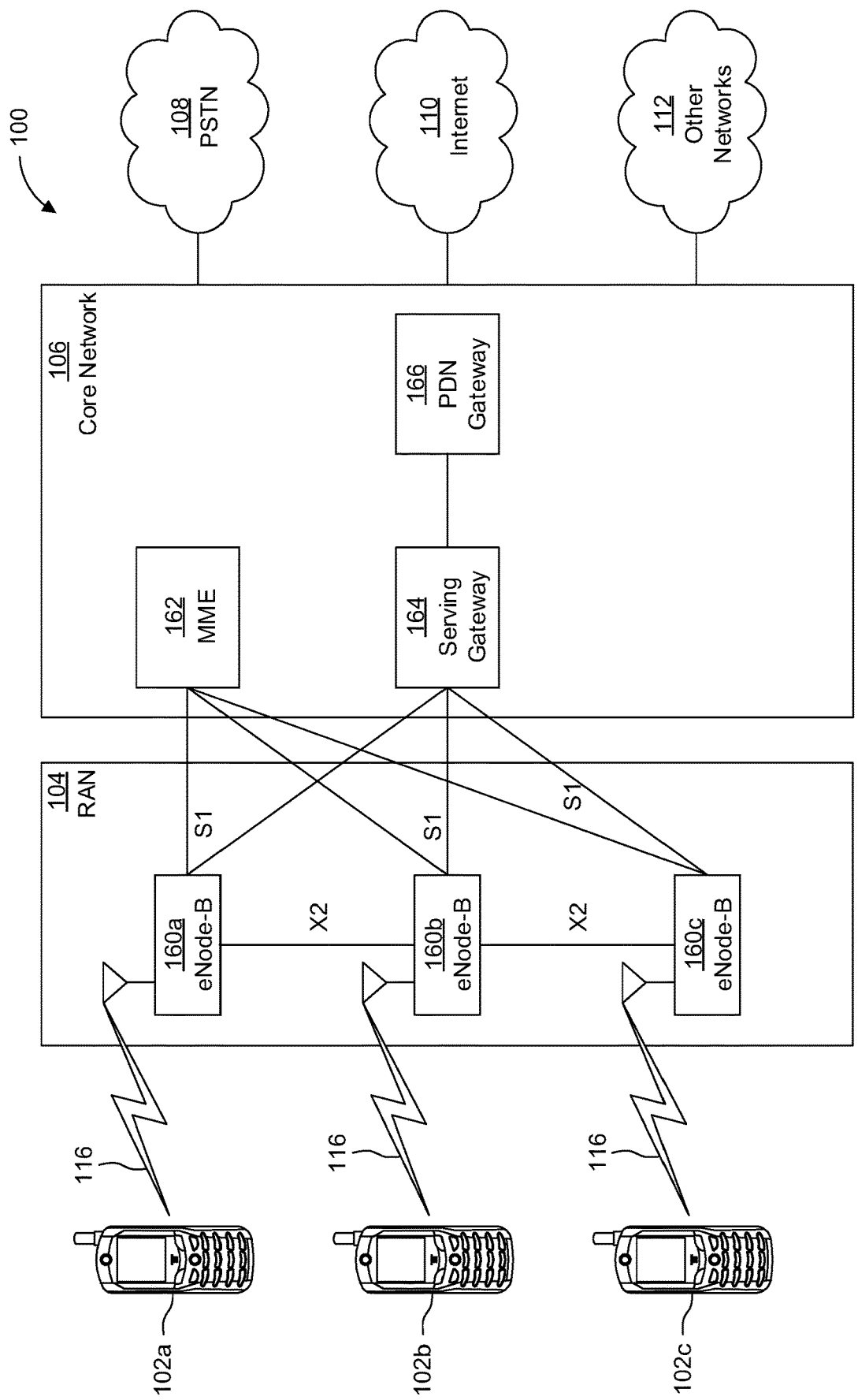
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 Megahertz (MHz) wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 Gigahertz (GHz) modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
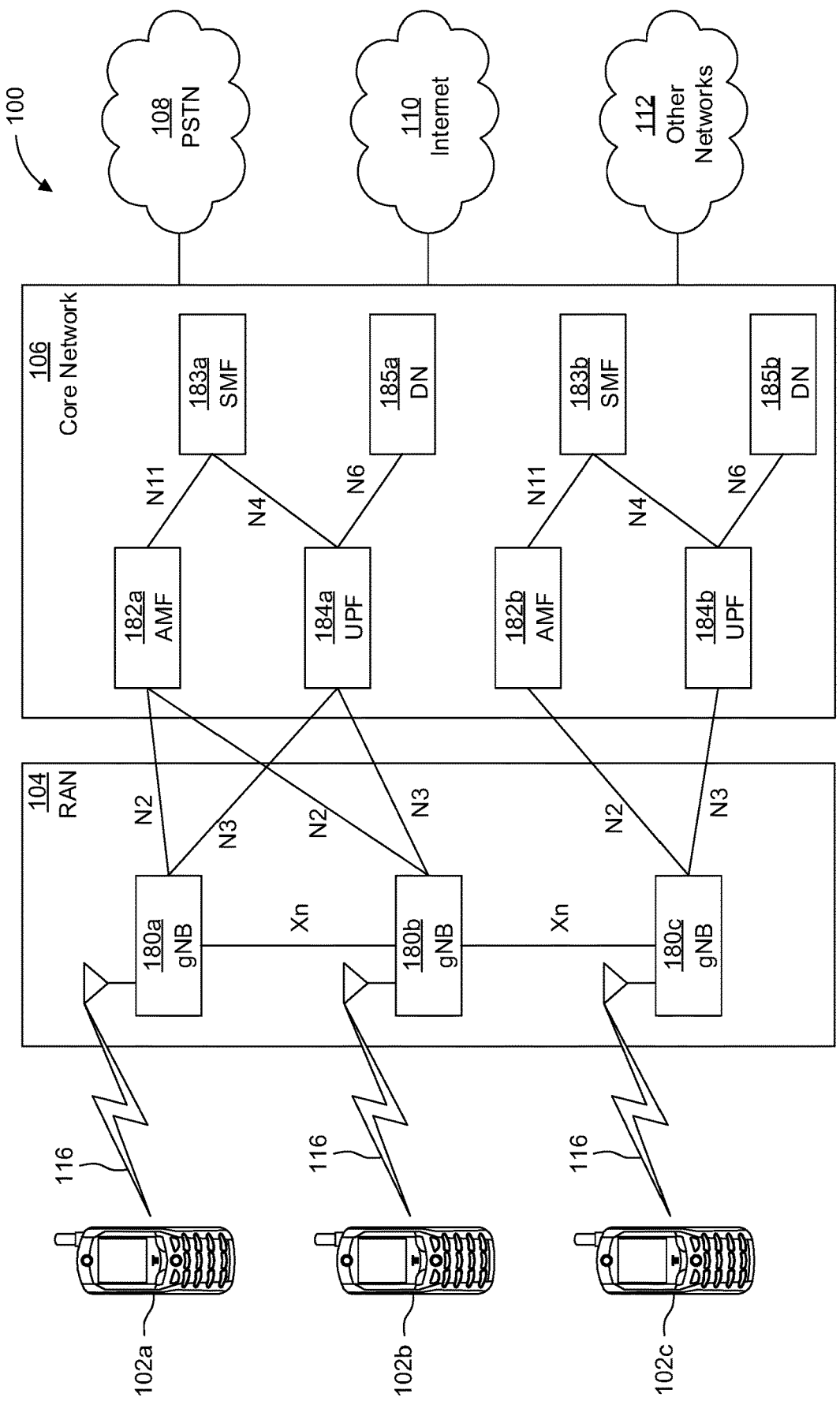
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gN Bs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following acronyms, in addition to others herein described, are used herein. CAI: Companion Air Interface; CPM: Continuous Phase Modulation; BW: Bandwidth; DL: Downlink; EVM: Error Vector Magnitude; HPBW: Half-Power Beam-width; FNBW: First-null Beam-width; NB: Narrow Band; OFDM: Orthogonal Frequency Division Multiplexing; PA: Power Amplifier; PAA: Phased-antenna-array; PSD: Power Spectral Density; RX: Receiver; RA: Random Access; RACH: Random Access Channel; RF: Radio Frequency; WB: Wideband; TA: Timing Advance; TX: Transmitter; TRX: Transceiver; UL: Uplink; VSWR: Voltage Standing Wave Ratio. WB TRX: wideband transceiver, e.g., main or primary transceiver. NB CAI TRX: narrowband companion air interface Transceiver.

The following definitions, in addition to others herein described, are used herein: Molecular absorption loss refers to loss caused due to interaction between very small particles (e.g., particles smaller than the wavelength in air). Transparency window loss refers to a contiguous spectrum without molecular absorptions (i.e., the spectrum that exists between lower side of spectrum to the first valley caused by molecular absorption or the spectrum between two valleys caused by molecular absorptions). Bandwidth to carrier ratio refers to a ratio of usable bandwidth to the carrier frequency. Superposition of antennae refers to adding non-overlapping narrower antennae bandwidths to make up larger RF bandwidth. Range refers to the distance between the transmitting and the receiving nodes.

In directional systems (e.g., multiple narrow beams based or "highly directional" systems) where large bandwidth utilization is required, the transmit and receive power for a radio that includes a Radio Front End and signal processing blocks consumes large amounts of energy (e.g., above a threshold amount of energy) to achieve high data rates in some cases. Accordingly, a narrowband companion air interface (NB CAI) is provided to mitigate energy loss or consumption, such as may be due to continuous or relatively frequent operation of the WB TRX for control and/or data plane exchanges. In a NB CAI assisted wideband transceiver (WB TRX), the control signaling of the WB TRX is carried via NB CAI to reduce combined energy utilization for both the NB CAI and WB TRX in some implementations. Further details of concept definitions and the interaction of the NB CAI and the WB TRX are described herein.

The bandwidth of an antenna is considered as the range of frequencies, on either side of a center frequency, where antenna characteristics (e.g., impedance, beam-width, polarization, gain, etc.) are within an acceptable (e.g., threshold) value of those at the center frequency.

For wideband (WB) (i.e., broadband) antennas, the bandwidth is typically expressed as a ratio of the upper-to-lower frequencies of acceptable operation. For example, a 10:1 bandwidth indicates that the upper frequency is 10 times greater than the lower frequency in some expressions.

For narrowband (NB) antennas, the bandwidth is typically expressed as a percentage of the frequency difference (e.g., upper minus lower) over the center frequency of the bandwidth. For example, a 5% bandwidth indicates that the frequency difference of acceptable operation is 5% of the center frequency of the bandwidth in some expressions.

In some implementations, antenna characteristics such as impedance, pattern, polarization, etc., are invariant if the electrical dimensions of the antenna remain unchanged (e.g., if all the physical dimensions are reduced by a factor the operating frequency is increased by the same factor.)

The gain or directivity of an antenna may be expressed as a ratio of the radiation intensity in a given direction to the radiation intensity averaged over all directions in some cases. In some cases, the terms directivity and gain are used interchangeably. In some cases, the terms directivity and gain differ in that directivity neglects antenna losses such as dielectric, resistance, polarization, and VSWR losses whereas gain does not.

Figure 2:
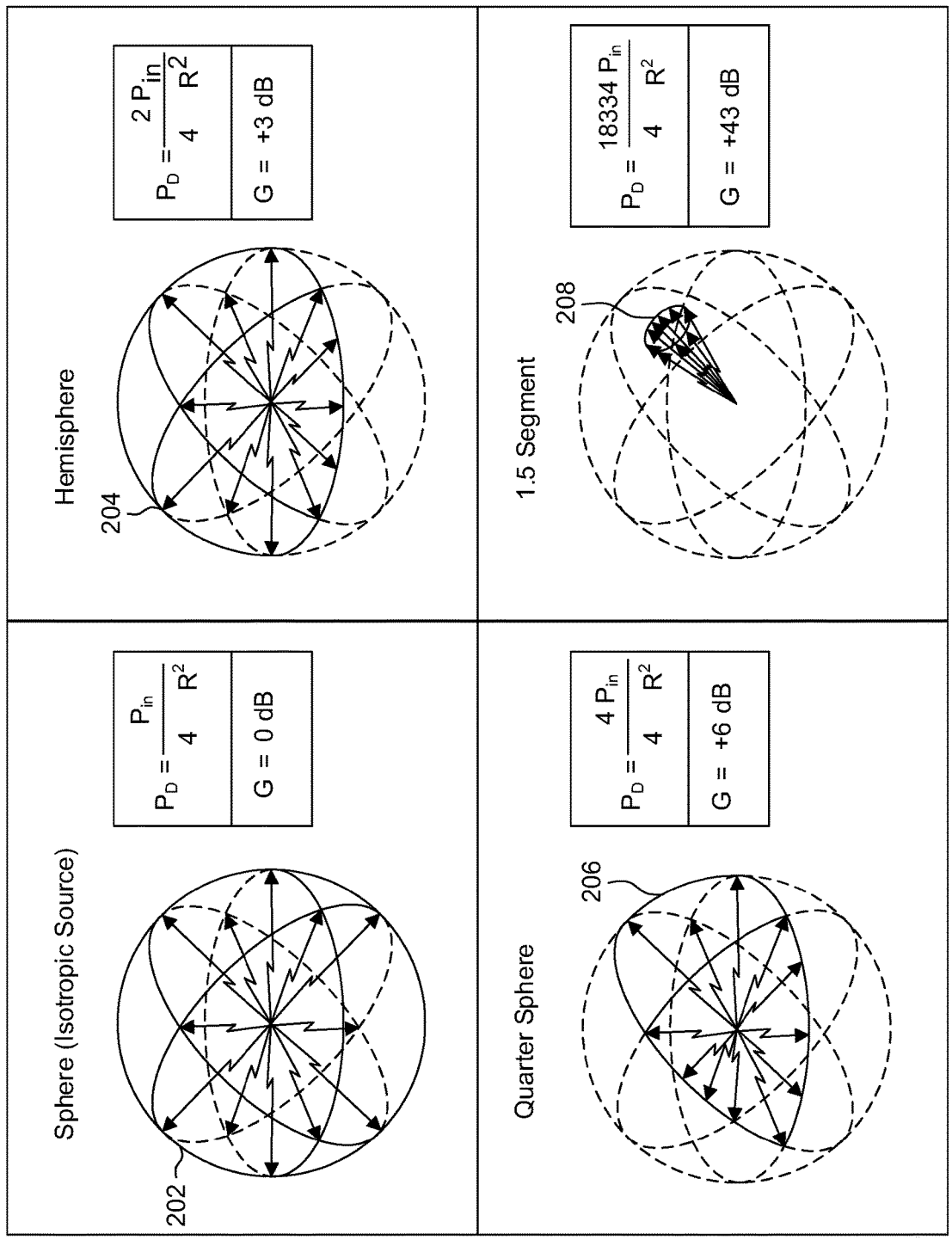
FIG. 2 is a diagram illustrating example antenna gain for different example radiation patterns.

Normalizing a radiation pattern by the integrated total power yields the directivity of the antenna. For example, if the angle in which the radiation is constrained is reduced, the directive gain goes up, as shown FIG. 2, which is a diagram illustrating example antenna gain for different example radiation patterns, including sphere 202 (isotropic source), hemisphere 204, quarter sphere 206, and segment 208 (e.g., 1.5 degree solid angle).

Real antennas do not exhibit an ideal radiation distribution. For example, energy varies with angular displacement and losses occur due to sidelobes in some cases. A real antenna model can be approximated using radiation pattern and beam-width measurements to choose from a combination of ideal antenna models.

The beam-width of the main lobe along with the side lobe level can be controlled by the relative amplitude excitation (distribution) between the elements of the antenna array. In some implementations, there is a trade-off between the beam-width and the side lobe level based on the amplitude distribution.

Half-power beam-width (HPBW) is used to define beam-width in some cases. HPBW is based on the angle, in a plane containing the direction of the maximum of a beam, between the two directions in which the radiation intensity is one-half value of the beam. First-null beam-width (FNBW) is used to define beam-width in some cases. FNBW is based on the angular separation between the first nulls of the antenna pattern.

Figure 3B:
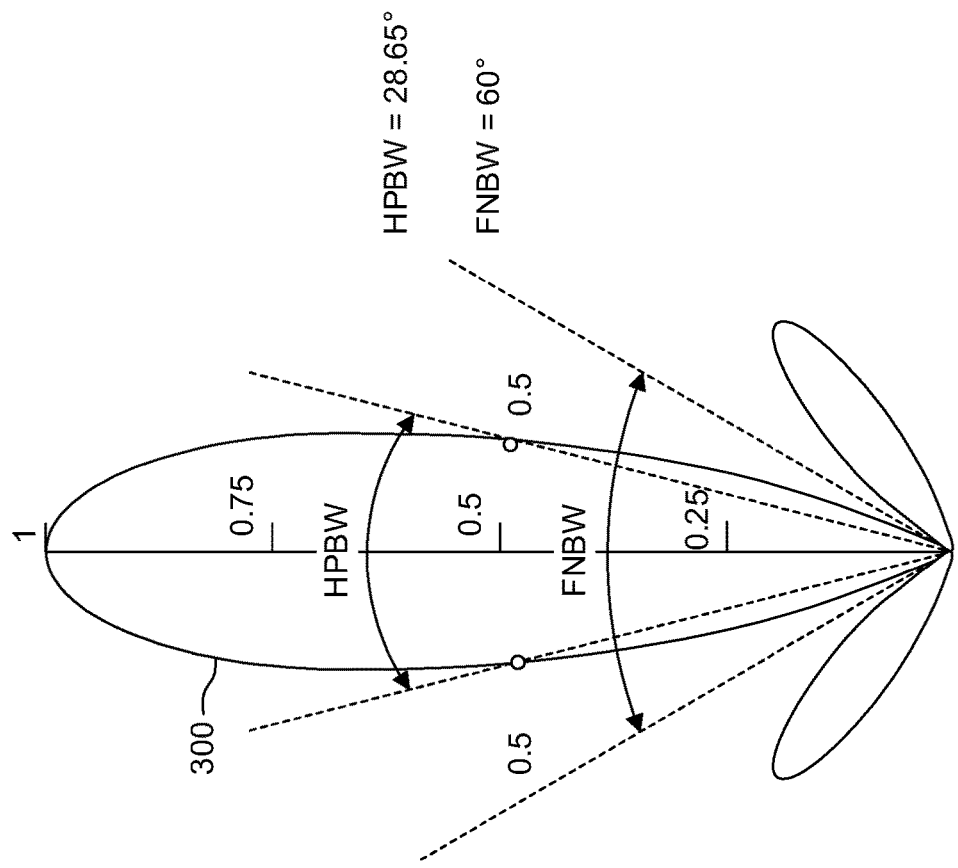
FIGS. 3A and 3B illustrate first-null beam-width (FNBW) and half-power beam-width (HPBW) for an example radiation pattern.
Figure 3A:
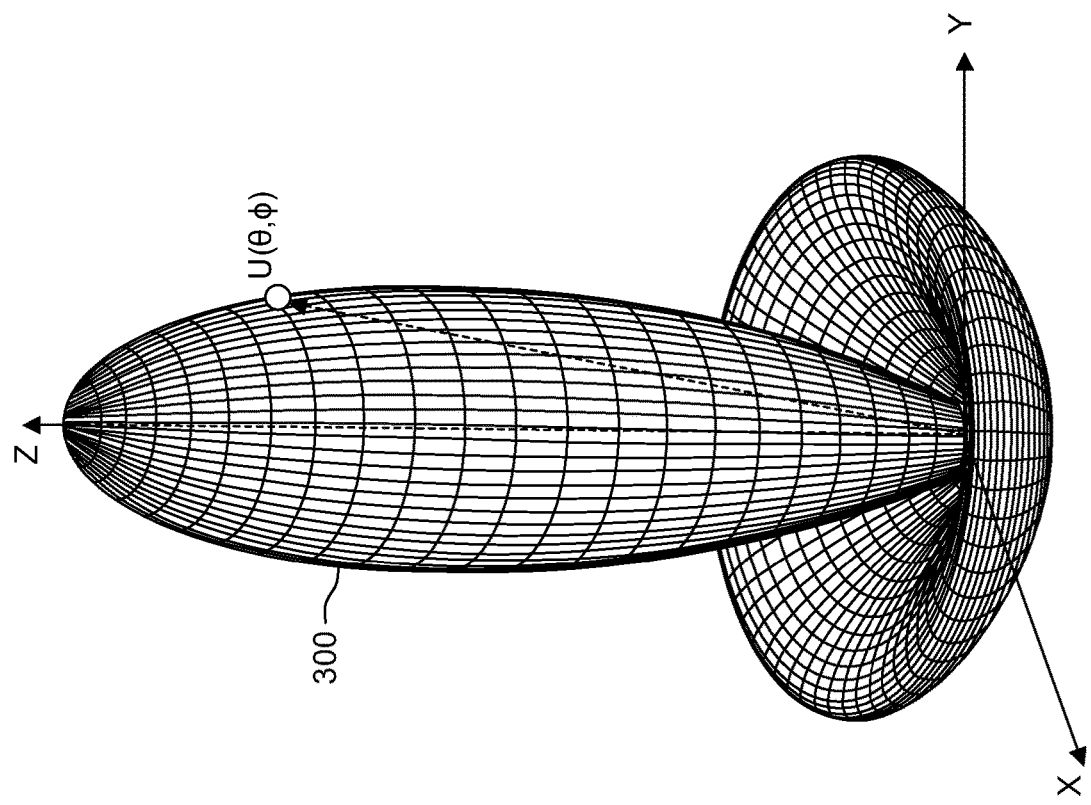

FIG. 3A and FIG. 3B illustrate an example radiation pattern 300 in three dimensions, and in a planar cross-section including the maximum of the beam of radiation pattern 300, respectively, showing both the HPBW and FNBW are shown for example radiation pattern 300.

In practice, the term "beam-width", with no other qualification, typically refers to HPBW, and refers to HPBW herein. The beam-width of the antenna can be used to describe the resolution capability of an antenna to distinguish between two adjacent radiating sources. This antenna resolution capability to distinguish between two sources is typically expressed as equal to half the first-null beam-width (FNBW/2), which is typically used to approximate the half-power beam-width (HPBW). For example, two sources separated by angular distances equal or greater than FNBW/2≈HPBW of an antenna with a uniform distribution can be resolved.

Figure 4:
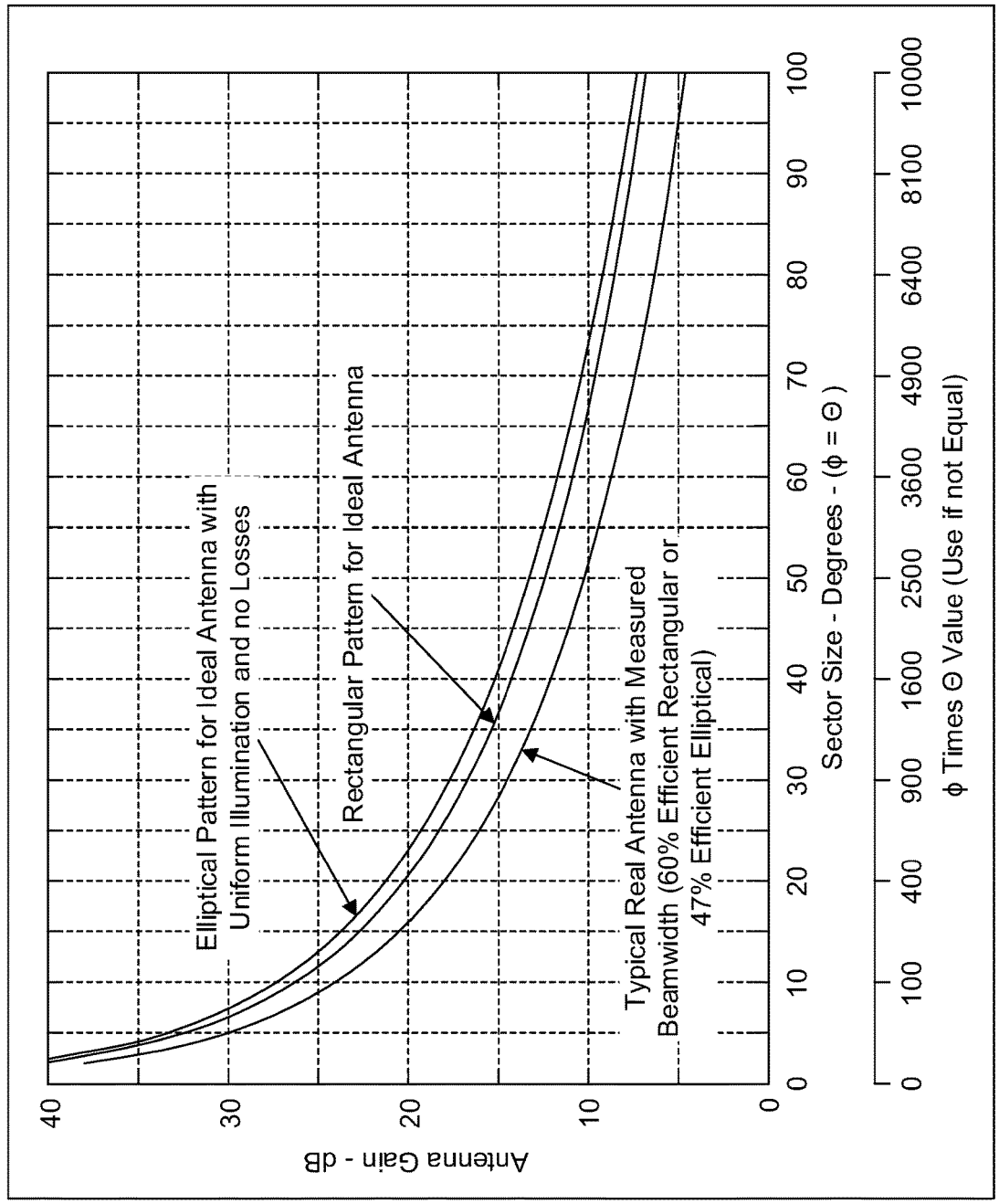
FIG. 4 is a line graph illustrating example antenna gain versus beam-width for several example antenna patterns.

FIG. 4 is a line graph 400 illustrating example antenna gain versus beam-width for several example antenna patterns. The upper plot of FIG. 4 shows the gain for an ideal antenna pattern using the elliptical model. The middle plot depicts the gain for an ideal antenna using the rectangular model. The lower plot of the same figure shows the gain of an example of a typical real antenna (with either a rectangular model using an efficiency of 60%, or an elliptical antenna model using an efficiency of 47%).

Table 1 below compares the performance of an example wideband transceiver versus an example narrowband transceiver operating in the THz band. As used herein, THz band refers to the radio spectrum overlapping the range which is typically referred to as the Terahertz Band and/or sub-Terahertz Band, which in some implementations covers and/or overlaps with the radio spectrum between 0.1 and 10 Terahertz. In table 1, the following assumptions have been made: Carrier frequency=300 GHz; Wideband Radio EVM=−26 dB; Narrowband Radio EVM=−40 dB; Fixed link distance=13 m; Wideband channel BW=25 GHz; and Narrowband channel BW=20 MHz, 250 MHz.

TABLE 1

|  | Wideband TRX | Narrowband TRX | |
| --- | --- | --- | --- |
|  | OFDM/16QAM (25 GHz) | CPM (250 MHz) | CPM (20 MHz) |
| PA back-off | −9 dB | −1.5 dB | −1.5 dB |
| Antenna gain | 35 dBi | 29 dBi | 26 dBi |
| Beam-width | 3 deg | 7 deg | 11 deg |
| Illuminated area | .364 m^2 | 1.986 m^2 | 4.922 m^2 |
| Area ratio | 1 | 5.46 | 13.52 |

In this example, to maintain the 13 m link operation and satisfy the power amplifier (PA) back-off requirement for OFDM/16 QAM, a high antenna gain of 35 dBi is required for the wideband transceiver, resulting in a narrower beam-width of 3 degrees. On the other hand, the narrowband transceiver with 20 MHz of modulation bandwidth only requires 26 dBi of antenna gain, resulting in a coverage area approximately 13.4 times larger than the reference wideband TRX equipped with a high gain antenna.

Figure 5:
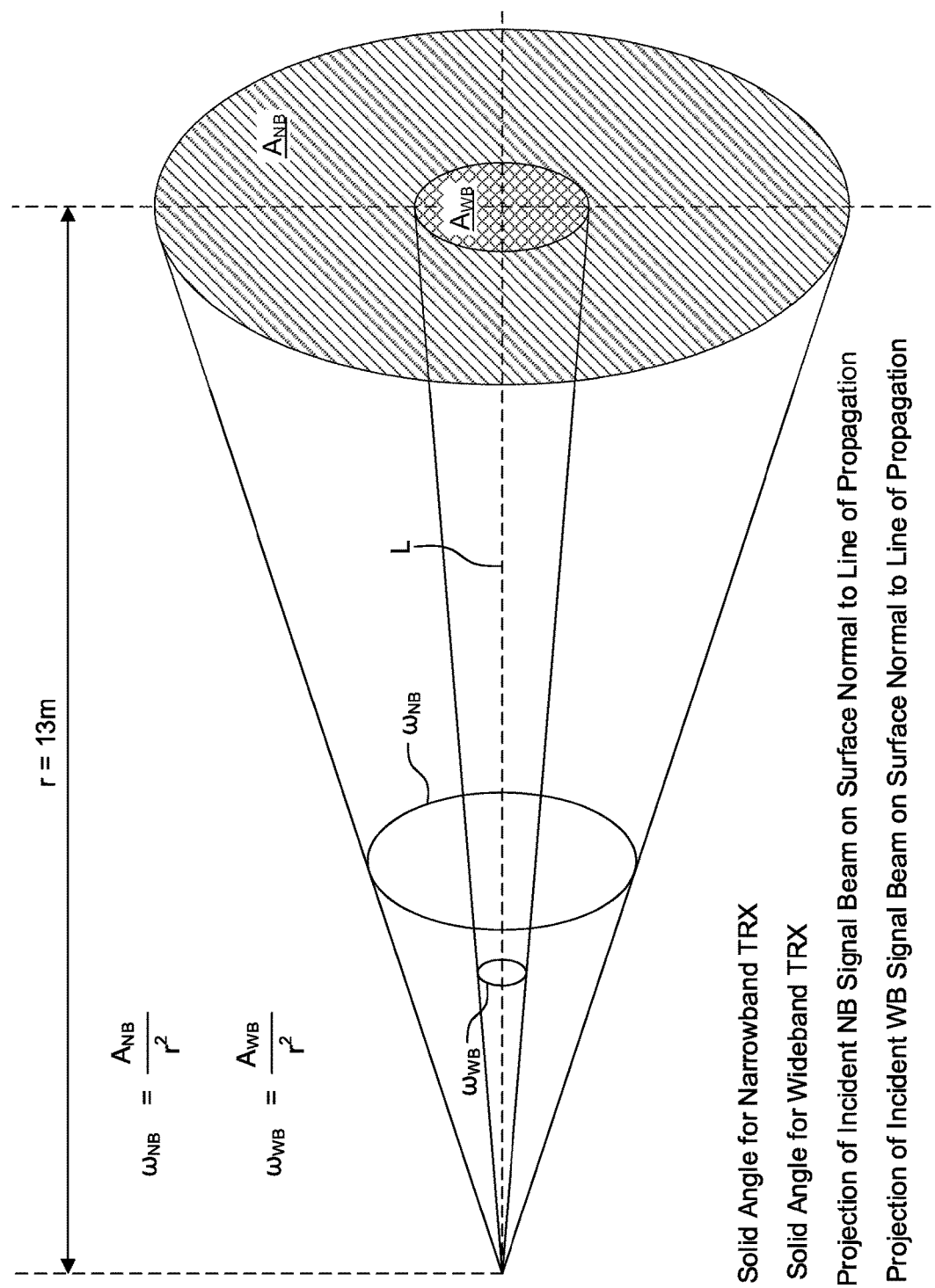
FIG. 5 is a chart illustrating example wideband versus narrowband signal beam projection on a plane.

FIG. 5 is a chart illustrating example wideband versus narrowband signal beam projection on a plane. FIG. 5 shows the surface projection of both narrowband and wideband signals along with their respective antenna beam-width at distance r of 13 m, between the transmitting antenna and the incident surface. $A_{NB}$ is the projection of an incident NB signal beam on a surface normal to line of propagation L, and $\omega_{NB}$ is the solid angle for the NB signal beam. $A_{WB}$ is the projection of an incident WB signal beam on a surface normal to line of propagation L, and $\omega_{WB}$ is the solid angle for the WB signal beam.

As can be seen in FIG. 5, the narrowband transceiver will have the ability to scan a given coverage area in a shorter time period than the wideband transceiver, due to its wider beam pattern. For example, for a NB TRX with a modulation bandwidth of 250 MHz, the coverage area is increased by a factor of approximately five and a half, as illustrated in Table 1.

A transparency window refers to a contiguous spectrum without (or below a threshold amount of) molecular absorptions (i.e. the spectrum that exists between lower side of spectrum to the first valley caused by molecular absorption or the spectrum between two valleys caused by molecular absorptions). It is noted that at a given distance, molecular absorption may create significant signal loss at some frequencies, which are referred to as molecular absorption valleys. The frequency band between two signal/path loss peaks, which can be used for communication without facing significant loss (e.g., due to molecular absorption), is referred to as a transparency window.

Within the THz band the received signal power spectral density (PSD) is related to the transmitted signal PSD by:

$$P_{rx}(f,d) = P_{tx}(f) - L_p(f,d) - L_A(f,d) \quad \text{Eq. 1}$$

Here, f is the operating frequency, d is the separation distance between the transmitter and the receiver, $P_{tx}(f)$ is the transmitted signal PSD, $L_p(f, d)$ is the distance-dependent free-space propagation loss, and $L_A(f, d)$ is the distance-dependent molecular absorption loss. $L_A(f, d)$ then captures the loss created in response to the absorption of electromagnetic (EM) waves by molecules in the channel. The molecular absorption phenomena is a occurs where the frequency of an EM wave is close to the resonant frequency for internal vibrational modes of a molecule. These phenomena are typically observed in the THz band, and not typically observed below the THz band. The absorbed EM energy by a certain molecule is then converted into kinetic energy. The absorption loss can be characterized by:

$$L_{A(f,d)} = \frac{1}{\tau(f,d)} = e^{K(f)d} \quad \text{Eq. 2}$$

Here, K(f) is the overall absorption coefficient estimated for different individual molecules and is dependent on the pressure (p) and temperature (T) of the medium, and the volume density and cross-section absorption of the molecules. $\tau(f, d)$ represents the transmittance of the medium and is approximated by the Beer-Lambert law.

Figure 6:
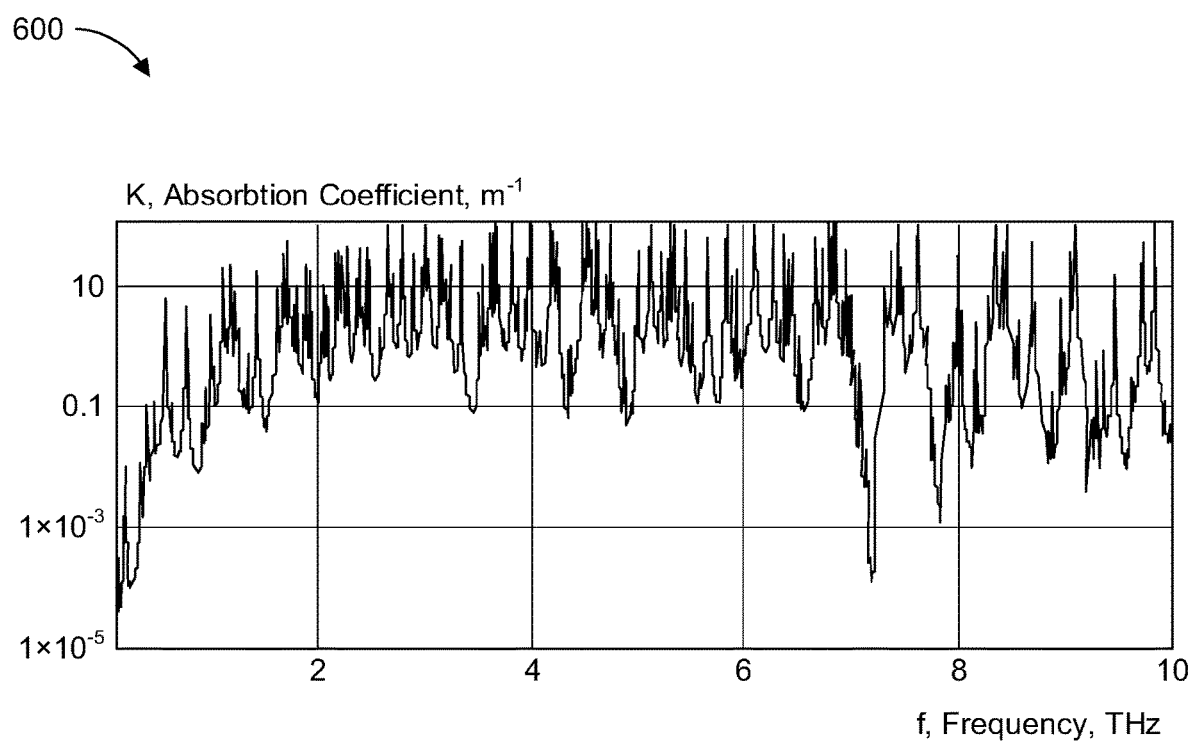
FIG. 6 is a line graph illustrating an example absorption coefficient plotted versus frequency.

FIG. 6 is a line graph 600 illustrating example absorption coefficient, K, plotted versus frequency, f. In the example of line graph 600, the absorption coefficient K(f) is evaluated in for T=296 K and 1.8% concentration of water vapor and plotted versus frequency range 0.1-10 THz.

Whereas the absorption coefficient is independent of the separation distance d, the medium transmittance depends on separation distance d. Further, molecular absorption is frequency selective; that is, the absorption is high (e.g., above a threshold and/or an amount which limits communication range to a threshold degree) at some frequencies, which may limit communication range at those frequencies.

A transparency window can be used to define a continuous range of frequencies where the molecular absorption is significantly smaller than in the rest of the band. In some such windows, the transmittance of the medium $\tau(f, d)$ is never smaller than, e.g., 95% for a certain separation distance d implying that the molecular absorption loss is as small as feasible in this example. From this transparency window definition, based on the medium transmittance, the transparency windows are distance dependent. Transparency windows are evaluated, for example, for the distance d∈{0.001, 0.01, 0.1} m in this example.

Figure 7:
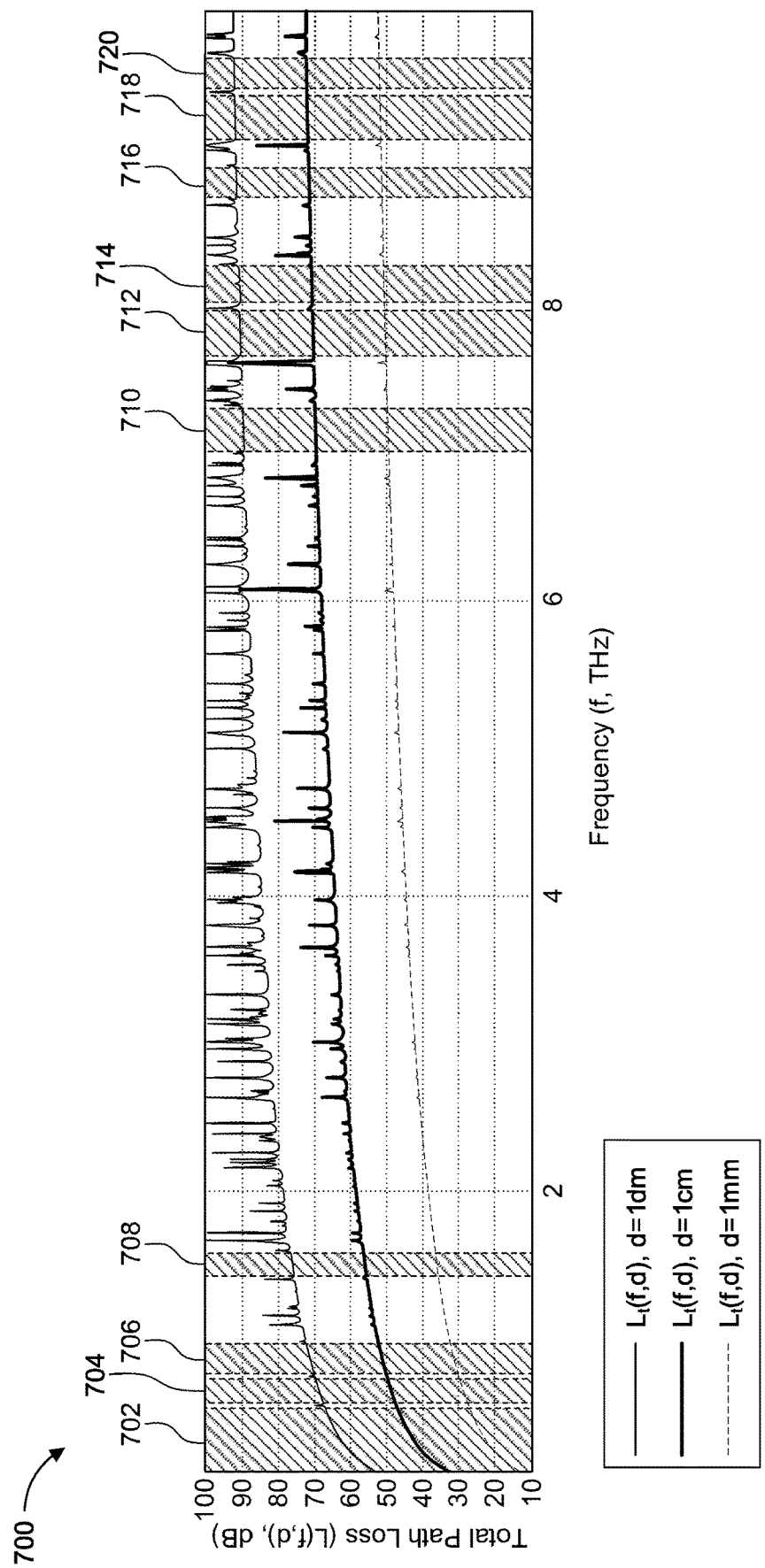
FIG. 7 is a line graph illustrating transparency windows for example distances as total path loss plotted against frequency.

FIG. 7 is a line graph 700 illustrating transparency windows 702, 704, 706, 708, 710, 712, 714, 716, 718, 720 for the example distances d∈{0.001, 0.01, 0.1} m where the total path loss L(f, d) is defined as:

$$L(f,d) = L_p(f,d) + L_A(f,d) \quad \text{Eq. 3}$$

Table 2 lists some of the example transparency windows shown in line graph 700 at a separation distance d=1 dm.

TABLE 2

| Number | Frequency (THz) | Width (GHz) |
|---|---|---|
| 1 | 0.1-0.54 | 440 |
| 2 | 0.63-0.72 | 95 |
| 3 | 0.76-0.98 | 126 |
| 4 | 7.07-7.23 | 160 |
| 5 | 7.75-7.88 | 130 |
| 6 | 8.04-8.15 | 80 |

Figure 8:
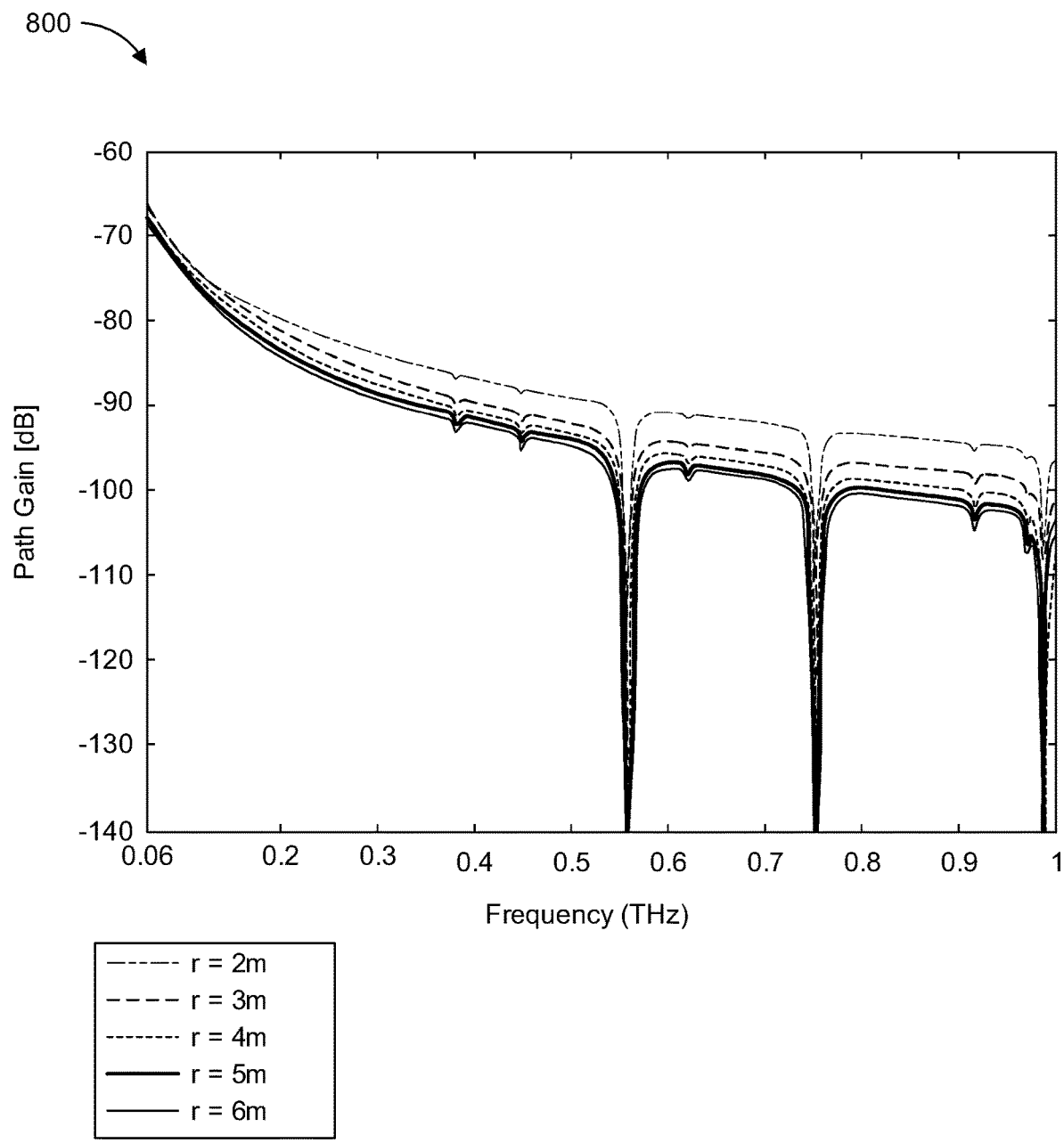
FIG. 8 is a line graph illustrating path gain as a function of frequency for several example separation distances.

FIG. 8 is a line graph illustrating path gain (i.e., the inverse of total path loss L(f, d)) as a function of frequency for several example separation distances. The total path loss is also evaluated in for separation distances $d \in \{2, 3, 4, 5, 6\}$ m, and plotted as path gain (−L(f, d)) versus frequency range [0.06, 1] THz as shown in FIG. 8.

Figure 9:
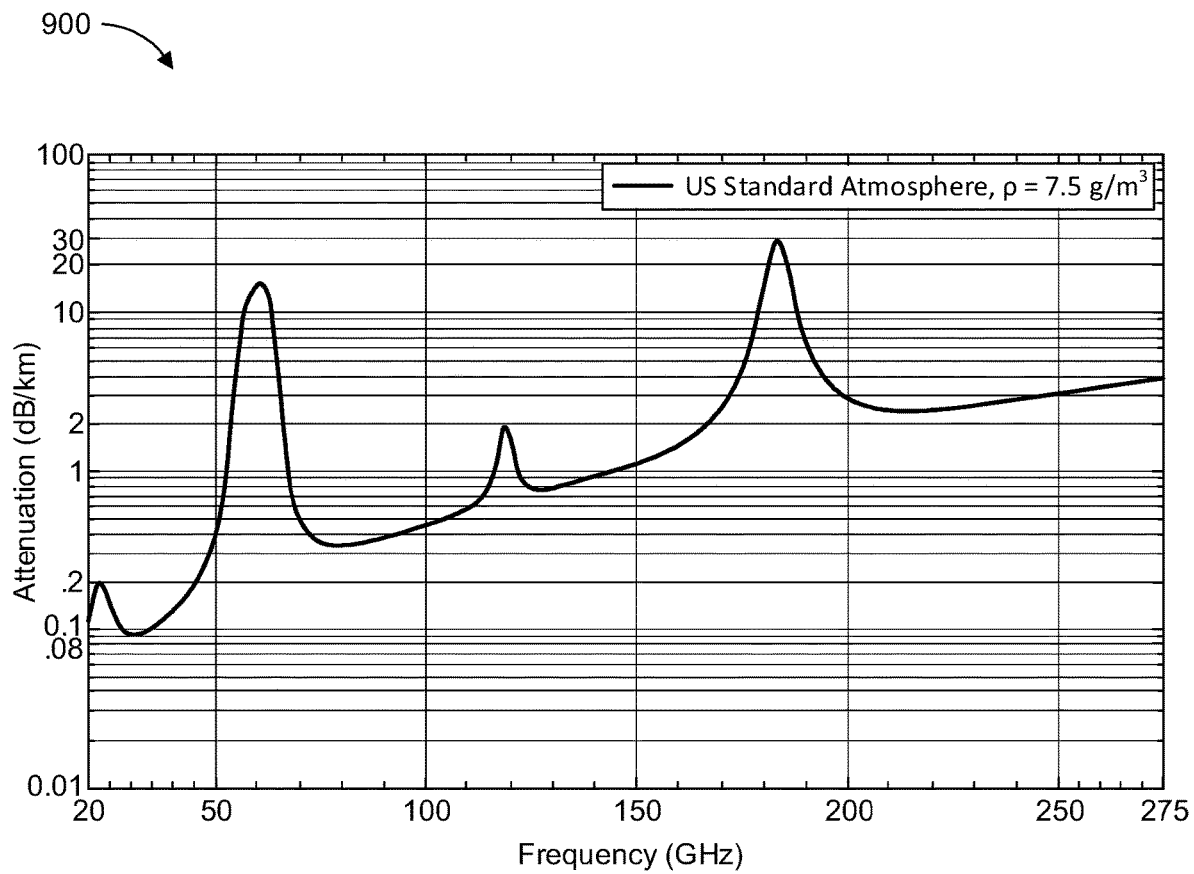
FIG. 9 is a line graph illustrating example attenuation plotted against frequency at an example atmospheric gas density.

FIG. 9 is a line graph 900 illustrating distance normalized path loss (i.e., attenuation) versus frequency over a range [20-275] GHz in for a US standard atmosphere, with atmospheric gas density $\rho = 7.5$ g/m$^3$ evaluated by the United States Federal Communications Commission (FCC) (*Attenuation by Atmospheric Gases*, Recommendation ITU-R P.676-10 (September 2013)).

In view of the foregoing, it is noted that increasing requirements for wireless communication systems to support low latency and high data rate may necessitate the utilization of higher frequency bands, such as the THz band, to access very large bandwidths. However, certain issues may hinder taking advantage of such desired bands.

For example, some such issues may relate to RF circuit design constraints. The operation of THz band devices, may include monitoring control plane signals more frequently (e.g., for initial access, paging & frequency synchronization) to maintain network connectivity, as compared to lower frequency (e.g. sub-6 GHz or millimeter wave (mmW)) devices. Frequent monitoring of control plane signals via a THz band wideband TRX may lead to a significant reduction in battery life of devices, as described further herein.

Some issues may relate to channel estimation. For example, sub-6 GHz radios may not be able to provide channel estimation measurements for WB TRX, whereas in-channel NB CAI may be able to provide channel estimation at in the THz band. This may be due to differences in channel behavior between THz band and sub-6 Ghz band frequencies. Lower (e.g., below a threshold) frequency bands, e.g., mmW or below sub-6 GHz, may be expected to be heavily used however due to large coverage compared to the THz band.

Some issues may relate to timing accuracy between NB and WB operation. For example, WB TRX data samples may require a clock rate that is significantly (e.g., 100's or 1000's of times) faster than the NB CAI TRX clock rate. The timing accuracy established based on narrowband signals may be sufficient for the NB CAI TRX; whereas, the timing accuracy needed for WB TRX may be significantly finer. The fine timing accuracy required for WB TRX may be comparable to the ratio of the bandwidths between the WB and NB TRX, in some cases. Since the WB TRX may not be continuously active (e.g., it may only be active when very high data rates are needed), fine timing synchronization may be lost. Accordingly, it may be desired to provide a WB RACH configured to attain WB TRX fine timing.

Some issues may relate to molecular absorption in the THz band. For example, (and e.g., as explained above) unlike the relatively lower frequency mmW channels, wireless propagation in the THz band may be impacted more by the molecular absorption phenomenon. In some cases, the characteristics of transparency windows may depend on range (i.e., distance) between the transmitting and receiving nodes, the carrier frequency, and/or environmental factors (e.g., humidity+dust+molecular structure of the air, etc.)

Figure 10:
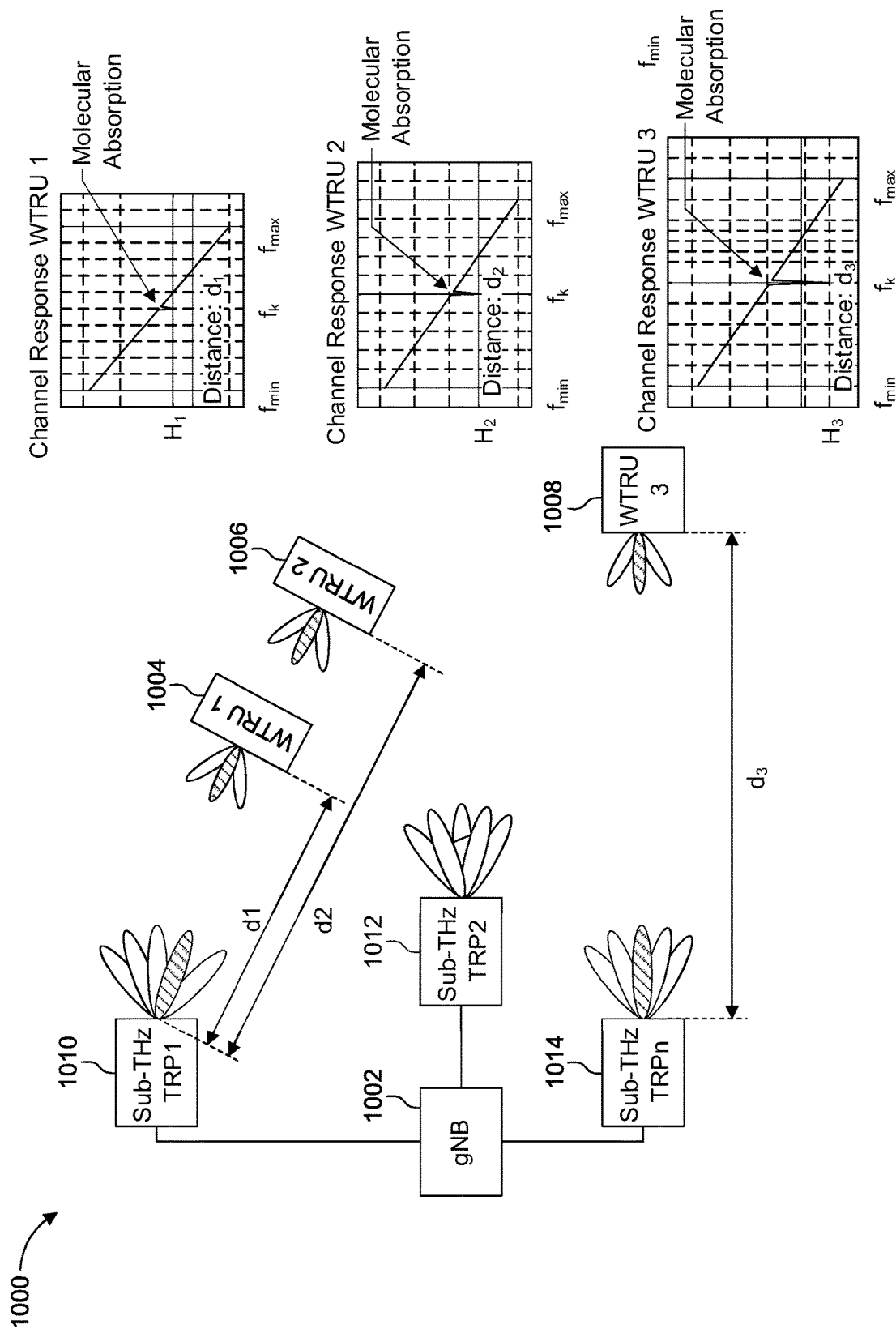
FIG. 10 is a diagram illustrating example molecular absorption over distance for THz band signals.

FIG. 10 is a diagram showing an example wireless system 1000 which illustrates example THz band molecular absorption level vs. distance. System 1000 includes gNB 1002, WTRUs 1002, 1004, 1008, and THz band transmission points 1010, 1012, 1014. It is noted that gNB 1002 is illustrated as a gNB for convenience, and that the principles described with respect to FIG. 10, as elsewhere herein, apply to any suitable base station, or other WTRU, or other transmission/reception point. Similarly, it is noted that WTRUs 1004, 1006, and 1008 may be implemented as a UE or any other suitable WTRU, and that the principles described with respect to FIG. 10, as elsewhere herein, apply to any suitable WTRU.

WTRUs 1004 and 1006 communicate with gNB 1002 via THz band transmission point 1010 on the THz band. WTRU 1006 communicates with gNB 1002 via THz band transmission/reception point 1010 on the THz band, from a distance d2. WTRU 1008 communicates with gNB 1002 via THz band transmission/reception point 1014 on the THz band, from a distance d3.

In system 1000, d3>d2>d1 as shown in FIG. 10. As the distance increases between the transmitting and receiving nodes, molecular absorption (e.g., as illustrated by a decrease in the channel response H1, H2, H3, at a frequency $f_k$ for WTRUs 1004, 1006, and 1008 respectively) increases. In some cases, such increasing molecular absorption may have the effect of limiting the device discovery and data throughput. It is noted that it may be desired to mitigate the molecular absorption for systems operating in the THz band.

Various techniques herein relate to an in-channel narrowband companion air interface. For example, a communication system with two transceivers, operational at upper mmW and THz bands, may include a narrowband companion air-interface (NB CAI) transceiver and a wideband (WB) main transceiver.

Figure 11:
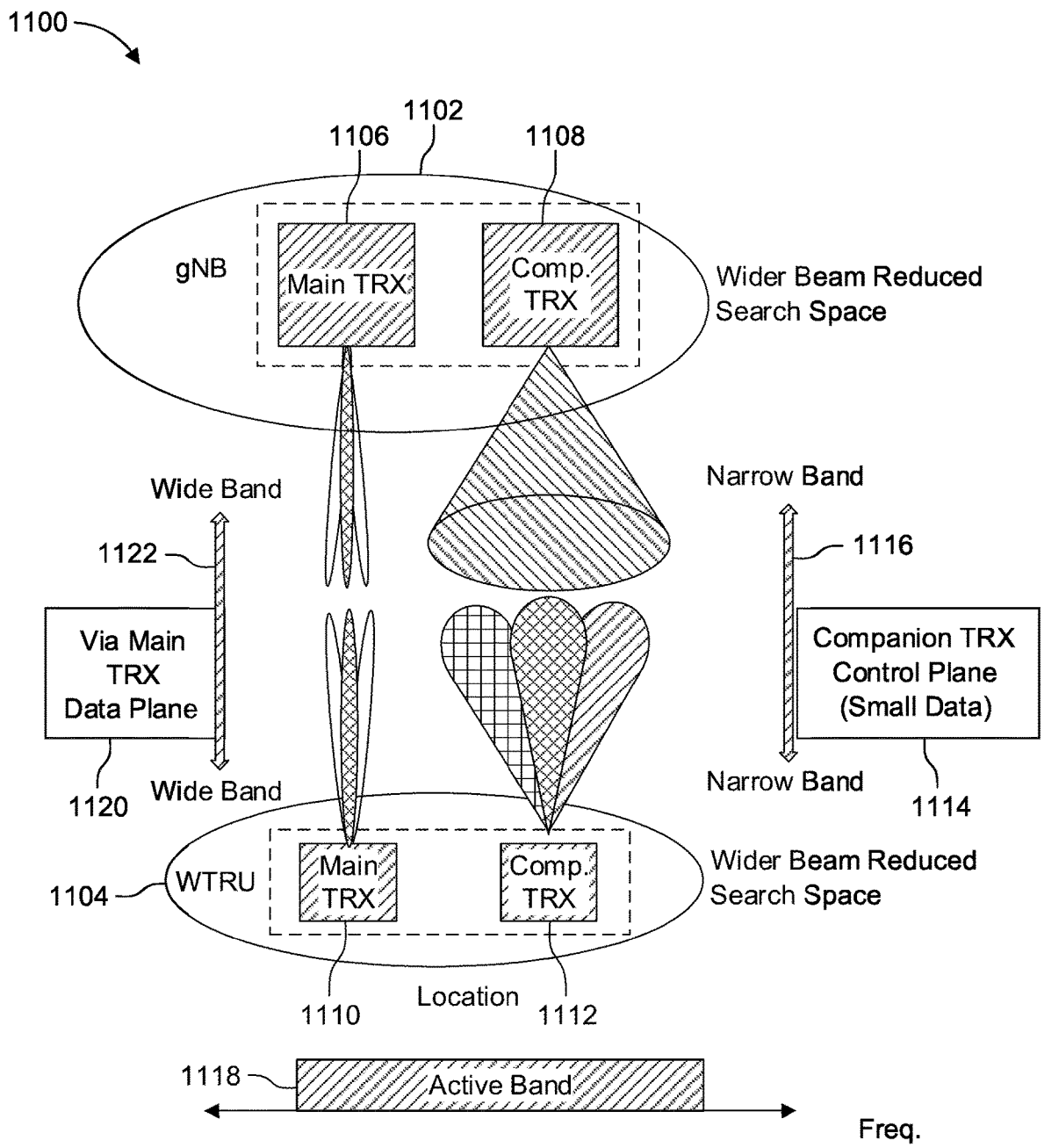
FIG. 11 is a block diagram illustrating an example in channel NB Companion air-interface and wideband (WB) transceiver (TRX)

FIG. 11 is a block diagram showing an example wireless system 1100 which illustrates example in-channel NB CAI TRX and WB main TRX operation. System 1100 includes a gNB 1102 and WTRU 1104. It is noted that gNB 1102 is illustrated as a gNB for convenience, and that the principles described with respect to FIG. 11, as elsewhere herein, apply to any suitable base station or other WTRU or other transmission/reception point. Similarly, it is noted that WTRU 1104 are labeled as a UE in FIG. 11, for convenience, and that the principles described with respect to FIG. 11 as elsewhere herein, apply to any suitable WTRU.

gNB 1102 includes a WB main TRX 1106, and CAI TRX 1108. WTRU includes a WB main TRX 1110, and CAI TRX 1112. WTRU 1104 and gNB 1102 exchange NB CAI communications 1114 between CAI TRX 1108 and CAI TRX 1112 over a narrow band 1116 within the active band 1118 (e.g., less than 10% of the active band). WTRU 1104 and gNB 1102 exchange WB main communications 1120 between WB main TRX 1106 and WB main TRX 1110 over a wide band 1122 within the active band 1118 (e.g., more than 90% of the active band). In this example, NB CAI communications 1114 are control plane communications, and WB main communications 1120 are data plane communications, although any suitable communications are communicable in other implementations. NB CAI communications 1114 are relatively smaller (e.g., smaller packet sizes, or packets with smaller payloads) than WB main communications 1120. Active band 1118 is the total bandwidth of the communication channel, and narrow band 1116 is a relatively smaller proportion of active band 1118 than wide band 1122.

In this example, the NB CAI TRX communications are deployed over the same channel as the WB Main TRX communications; i.e., the channel, as represented by active band 1118, is used by both NB CAI TRX and WB TRX.

Table 3 includes a qualitative comparison of example design aspects of example WB main TRX 1106, CAI TRX 1108, WB main TRX 1110, and CAI TRX 1112. The NB CAI TRX utilizes relatively narrow bandwidth with relatively high efficiency and larger power spectral density relative to the WB main TRX. The NB CAI beam-width is wider compared to WB Main TRX such that the overlapping range is the same.

TABLE 3

| | gNB 1102 | | WTRU 1104 | |
| --- | --- | --- | --- | --- |
| TRX | NB CAI TRX 1108 | WB Main TRX 1106 | NB CAI TRX 1112 | WB Main TRX 1110 |
| Coverage | Overlaps with WB Main TRX | Overlaps with NB CAI TRX | Overlaps with WB Main TRX | Overlaps with NB CAI TRX |
| Relative Power budget | Sufficient | Sufficient | Limited | Limited |
| Relative Number of antenna elements | Sufficiently large | Sufficiently large | Limited | Limited |
| Relative beam-width | Larger | Narrower | Larger | Narrower |
| Relative Flexibility | Deployable in multiple frequency raster within the channel of interest | Deployment to cover the whole channel | Deployable in multiple frequency raster within the channel of interest | Deployment to cover the whole channel |
| Relative Control and Data plane features | Control Plane mode with small data enabled | High throughput with ACK/NACK, limited measurements support | Control Plane mode with small data enabled | High throughput with ACK/NACK, limited measurements support |

In this example, it is assumed that the WTRU has a limited power budget whereas the gNB has sufficient power budget. The terms in-channel NB CAI, NB CAI, in-channel CAI, NB TRX, NB mode, and NB interface may be used interchangeably herein. WB TRX, Main TRX, WB Main TRX, Primary TRX, WB Primary TRX, WB mode, and WB interface may be used interchangeably herein. Energy consumption differs in some cases between NB CAI and WB TRX.

Figure 12:
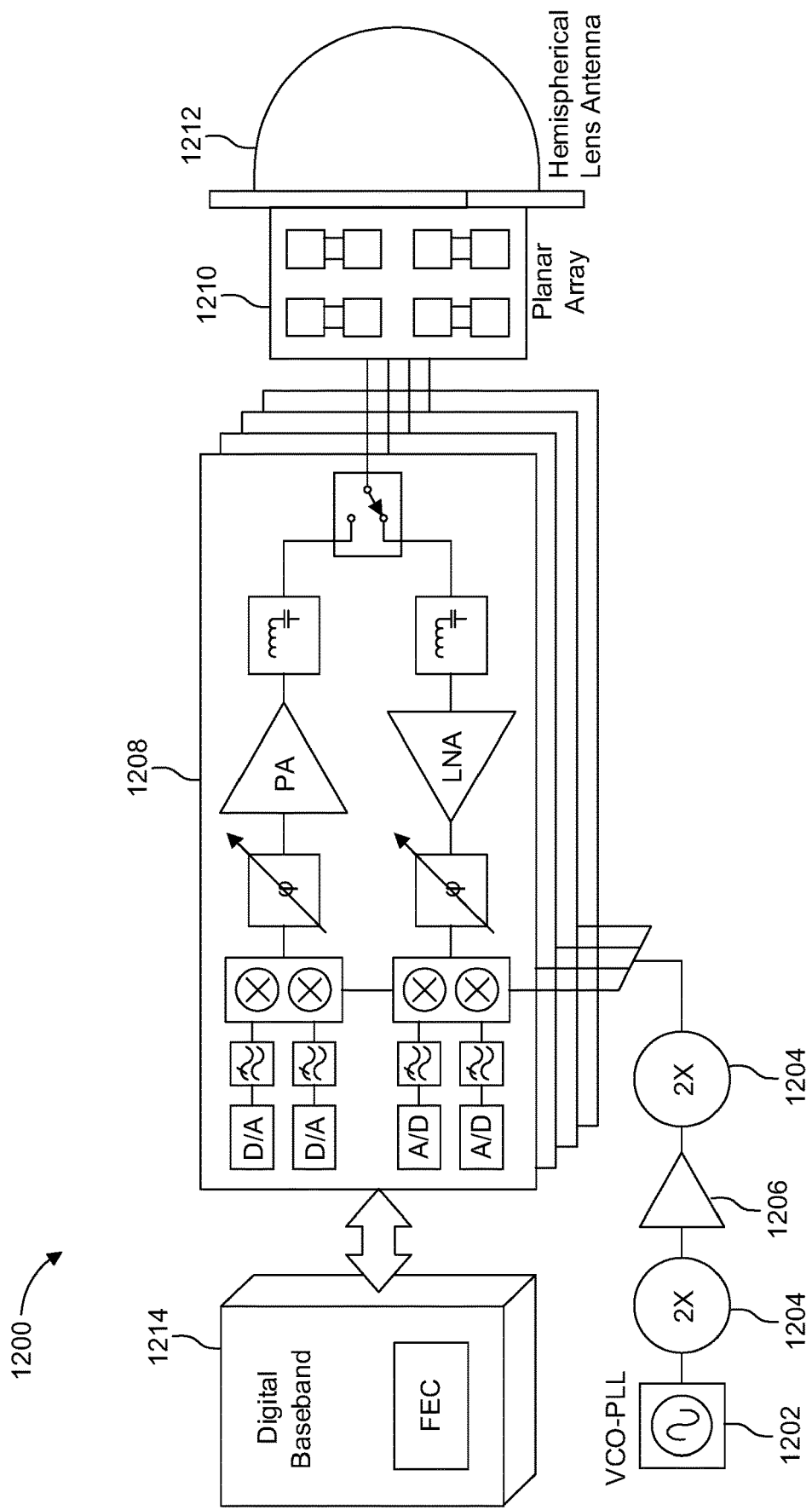
FIG. 12 is a block diagram illustrating an example architecture for a THz band wideband radio used to estimate power consumption.

FIG. 12 is a block diagram illustrating an example architecture for a THz band wideband radio 1200 used to estimate power consumption. The carrier frequency of wideband radio 1200 is assumed to be 300 GHz in this example. The channel bandwidth of wideband radio 1200 is assumed to be 25 GHz and the modulation type is 16-QAM in this example. The THz band wideband radio design is able to deliver a link distance of 10 m or better and a data rate of 100 Gbps in this example.

The transceiver of example wideband radio 1200 is includes a phased-antenna-array (PAA) transmitter and a PAA receiver (RX) in this example. The PAA transmitter employs a conventional IQ direct up-conversion architecture in this example. Similarly, the PAA receiver employs an IQ direct down-conversion receiver in this example. The 300 GHz LO generator is assumed to employ a 75 GHz voltage controlled oscillator (VCO)/phase locked loop (PLL) 1202 and a 4× frequency multiplier including a pair of 2× multipliers 1204 and an amplifier 1206 in this example. The transceiver is assumed to operate in time division duplex (TDD) mode in this example. Four TDD transceivers 1208 are used to feed a planar array 1210 including 4 antenna elements in this example. Each antenna element includes 2 patch antennas in this example. The planar array is used to feed and steer a hemispherical lens antenna 1212 in this example. In some cases, this provides the best, or a desirable, combination of antenna gain and steerability. Wideband radio 1200 includes a digital baseband processor 1214 which includes forward error correction.

In some implementations, a THz band narrowband companion radio exchanges control information between the network (e.g., a gNB or other base station, or other network node) and the WTRU. It is noted that communications in the various examples herein are described as taking place between the WTRU and a gNB for the sake of example, and it is noted that the same or analogous communications and the principles described are also applicable to communications between the WTRU and other base stations and/or network nodes. In this example, the companion radio is assumed to employ an architecture similar to wideband radio 1200. In some examples, the companion radio differs in that the IQ receiver excludes the LNA, e.g., for power consumption purposes. The channel bandwidth of the narrowband radio is assumed to be 20 MHz in this example. The sub-THz narrowband radio design is able to deliver a link distance of 75 m or better in this example. A near-constant-envelope modulation of 16-PSK is assumed for the narrowband radio to maximize link distance in this example.

Example power consumption of the major components in both the wideband and narrowband radios is summarized in Table 4.

TABLE 4

| | Wideband Radio OFDM/16QAM Channel BW = 25 GHz | | Narrowband Radio CPM/16PSK Channel BW = 20 MHz | |
|---|---|---|---|---|
| | # | Total Power | # | Total Power |
| Low-noise amplifier (LNA) | 4 | 230 mW | 0 | Not applicable |
| Analog to digital converter (ADC) | 8 | 2240 mW | 8 | 31 mW |
| Polar Decoder | 1 | 200 mW | 1 | 2 mW |
| Power amplifier (PA) | 4 | 810 mW | 4 | 195 mW |
| Digital to analog converter (DAC) | 8 | 1360 mW | 8 | 20 mW |
| Local oscillator (LO) Generator | 1 | 420 mW | 1 | 420 mW |

The total power consumption of the wideband and narrowband transmitter and receiver are contrasted in Table 5. For example, the narrowband transmitter delivers a 4.1× power reduction compared to the wideband transmitter, and the narrowband receiver delivers a 6.8× power reduction compared to the wideband RX.

TABLE 5

| | Wideband Radio | Narrowband Radio | Power Reduction Factor |
|---|---|---|---|
| RX mode power | 3090 mW | 453 mW | 6.8x |
| TX mode power | 2590 mW | 635 mW | 4.1x |

Here, TX mode power is the sum of the components used in the Tx chain (DAC, PA, LO), and RX mode power is the sum of the components used in the Rx chain (ADC, LNA, LO). The 3GPP random access (RA) procedure (also known as random access channel (RACH) procedure) is used by a WTRU to access a network for data transmission and reception. A RACH procedure may triggered by one or more of events, such as an initial access from RRC_IDLE; a radio resource control (RRC) connection re-establishment procedure; a transition from RRC_INACTIVE; a request for other system information; and/or beam failure recovery.

Two types of random access procedure are supported in 3GPP NR: 4-step and 2-step. Both types of RACH procedures support contention-based random access (CBRA) and contention-free random access (CFRA), as shown in FIG. 21, FIG. 22, FIG. 23, and FIG. 24. The WTRU selects the type of random access to use for the RACH procedure based on a network configuration. For example, in some implementations, if CFRA resources (e.g., preamble sequence and time and frequency resources for transmitting CFRA preamble sequence) are not configured, a reference signal received power (RSRP) threshold may be used by the WTRU to select between CBRA based 2-step RA type and CBRA based 4-step RA type. In some implementations, if CFRA resources for 4-step RA type are configured, the WTRU may perform random access with a CFRA based 4-step RA type. If CFRA resources for 2-step RA type are configured, the WTRU performs random access with a CFRA based 2-step RA type.

In an example 4-step RA procedure, the WTRU transmits a first RACH message (MSG1), which is a preamble sequence, over a physical random access channel (PRACH) at a power level. In 3GPP NR, the UE may transmit the preamble using a resource (e.g., time and frequency resource for transmitting and receiving signals) or resources, called a RACH occasion or occasions, that is associated with the preferred synchronization signal/physical broadcast channel (SS/PBCH, also known as SSB) selected by the WTRU. To transmit the preamble sequence (i.e., MSG1), the WTRU may use an spatial domain transmission filter (i.e., Tx beam) corresponding to the spatial domain receive filter (i.e., Rx beam) used to receive the preferred SS/PBCH block (e.g., with the SS/PBCH block with maximum RSRP among the SS/PBCH blocks received by the WTRU irrespective of WTRU Rx beam). In some implementations, the WTRU may select any SS/PBCH block as long as it is received with above a minimum threshold. The preamble transmission power may be based on configured parameters and/or measurements. The WTRU may receive parameters (e.g., configured parameters), which may be provided by the gNB. The parameters may include one or more of initial preamble power, a random access response (RAR) window size, a power ramping factor, and/or a maximum number of retransmissions.

The time-frequency resource or resources for preamble transmission, i.e., RACH occasion or occasions, may be chosen by the WTRU from a set of RACH occasions allocated for each SS/PBCH block. The configuration parameters to derive the SS/PBCH block-to-RACH occasion mapping may include slot numbers, a starting symbol, a number of PRACH occasions within a RACH slot, a PRACH duration, a number of SSBs mapped to each PRACH occasion, a number of PRACH occasions frequency multiplexed in one time instance, a starting physical resource block (PRB), and/or other configuration parameters.

The configuration parameters may be provided by the gNB. The PRACH resources, which may include preambles or sets of preambles, may be provided or configured by the gNB. In a CBRA based procedure, the WTRU may determine the preamble sequence based on the configuration parameters. The configuration parameters, which may be provided by the gNB, may include index to logical root sequence table, cyclic shift, set type (unrestricted, restricted set A, or restricted set B), number of contention based preambles per SS/PBCH block, total number of RA preambles, etc.

After the WTRU transmits the MSG1, if the gNB detects the preamble, it may respond with a second RACH message (MSG2), also referred to as a random access response (RAR)). The WTRU may monitor for reception of a RAR. To receive the RAR, the WTRU may assume the same spatial domain receive filter (i.e., Rx beam) as for a SS/PBCH block the WTRU used for PRACH association. Monitoring for a RAR may include monitoring for a Radio Network Temporary Identifier (RNTI), e.g., a RA-RNTI. Monitoring for a RNTI may include monitoring for a control channel or Downlink Control Information (DCI) masked or scrambled (e.g., with a Cyclic Redundancy Check (CRC) scrambled) with the RNTI. The control channel or DCI may include the RAR or may be associated with a data channel that may carry the RAR. An RAR may indicate for which transmitted preamble(s) the RAR corresponds or is intended. Multiple RARs (e.g., for different transmitted preambles that may have been transmitted by different WTRUs) may be transmitted simultaneously (e.g., in the same control channel or data channel). A RAR may include at least one of: a timing advance (TA) value, a set of resources on which to transmit (e.g., in the UL using the physical uplink data channel (PUSCH)), and/or a temporary connection (TC)-RNTI.

The WTRU may determine the RA-RNTI for which to monitor for RAR reception based on the time and/or frequency of the preamble transmission. The RA-RNTI for which the WTRU may monitor may be a function of the time period (e.g., subframe) in which the WTRU transmitted (e.g., began transmission) of the preamble. For example, if the WTRU transmitted, in subframe 3 of a frame, the RA-RNTI may be 3. The RA-RNTI may be a function of the frequency resource or resources that the WTRU used for transmission of the preamble.

If the WTRU does not receive an RAR (e.g., using the determined RA-RNTI) indicating the preamble transmitted by the WTRU within the RAR window, the WTRU may send another preamble at a later time. The transmission at the later time (e.g., re-transmission) may be at a higher power. The power may be limited to a maximum power. The WTRU may change the spatial domain transmission filter (i.e., Tx beam) for the transmission at the later time. If the WTRU changes the spatial domain transmission filter, it may not increase its transmission power may starts with the same power used for the previous attempt using a different spatial domain transmission filter.

Figure 21:
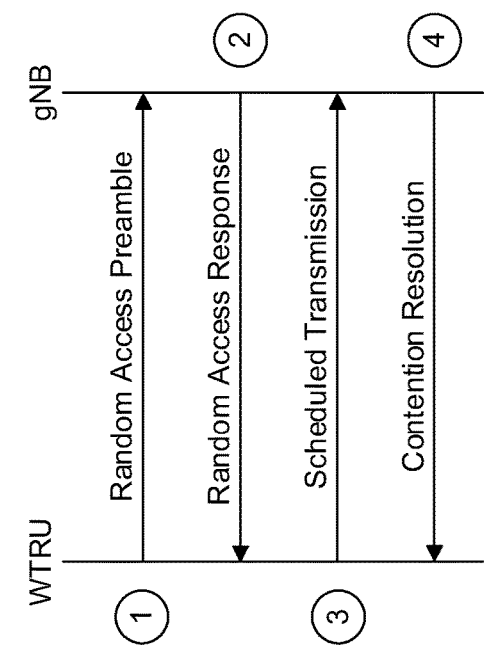
FIG. 21 illustrates an example 4-step RACH type contention based random access (CBRA) procedure.
Figure 23:
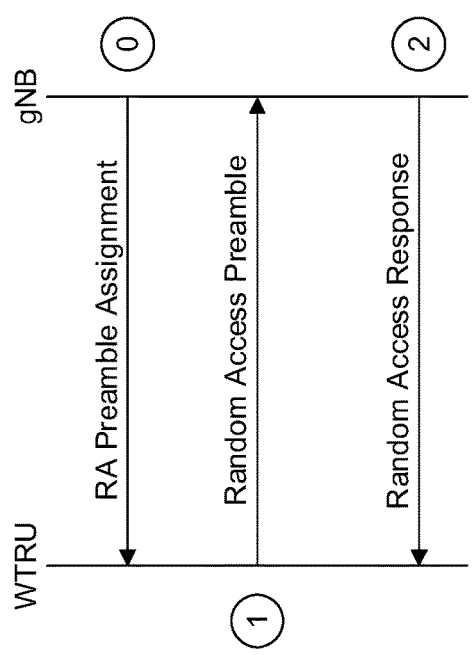
FIG. 23 illustrates an example 4-step RACH type contention free random access (CFRA) procedure.

For CFRA, a dedicated preamble for MSG1 transmission is assigned by the network and based on receiving RAR from the network, the WTRU ends the RA procedure as shown in FIG. 23. For CBRA, based on reception of the RAR, the WTRU sends a third RACH message (MSG3) using the resource allocated for the PUSCH as shown in FIG. 21. The WTRU may apply a TA (received in the RAR) for the MSG3 transmission. The MSG3 may include a RRCSetupRequest message, which may include an initial WTRU identity (e.g., random value) for the initial RRC connection setup. The contents of the MSG3 may be different based on the reason that the RACH procedure was initiated (e.g., initial access, handover, beam failure recovery, etc.). After MSG3 is transmitted, the WTRU may monitor for a fourth RACH message (MSG4). For the MSG4, the WTRU may monitor a DCI masked or scrambled with a temporary cell RNTI (TC-RNTI). The DCI may be associated with a data channel that may carry the contention resolution message, which may be or include a WTRU identity included in MSG3. After sending the MSG3, if the WTRU does not receive the MSG4 within a configured time window (e.g., contention resolution timer), the WTRU may begin the RACH process again with another MSG1 transmission.

Figure 22:
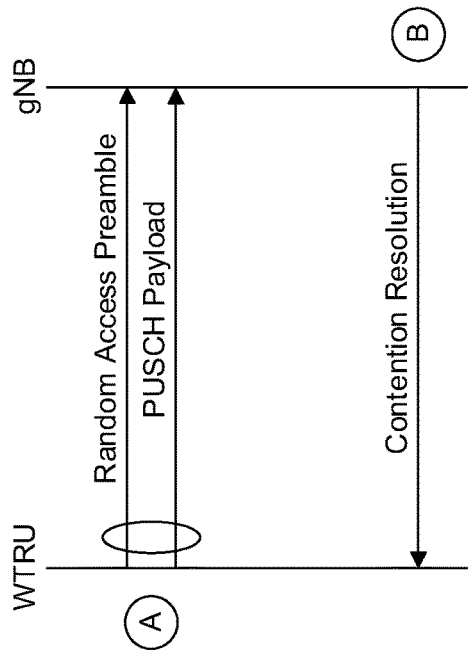
FIG. 22 illustrates an example 2-step RACH type CBRA procedure.
Figure 24:
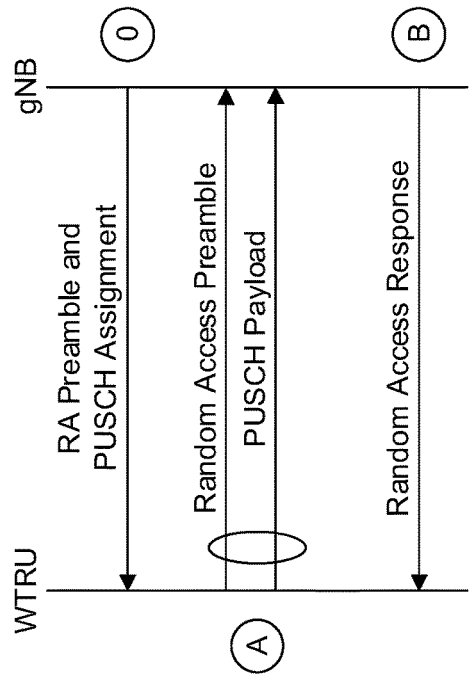
FIG. 24 illustrates an example 2-step RACH type CFRA procedure.

In the case of 2-step RA type, the WTRU sends a first RACH message (MSGA) which includes a preamble on PRACH and a payload on PUSCH. It is noted that the payload on the PUSCH component of MSGA may be the same or similar to what is sent by the WTRU in MSG3 of the 4-step RACH procedure. After transmitting MSGA, the WTRU monitors for a response (RACH MSGB) from the network within a configured window. For CFRA, dedicated preamble and PUSCH resources are configured for MSGA transmission. Based on receiving the network response (i.e., MSGB), the WTRU ends the random access procedure as shown in FIG. 24. For 2-step CBRA, if contention resolution is successful after receiving the network response, the UE ends the random access procedure as shown in FIG. 22.

In the case that a fallback indication is received in MSGB, the UE performs MSG3 transmission using the UL grant scheduled in the fallback indication and monitors contention resolution. If contention resolution is not successful after MSG3 (re)transmission(s), the UE goes back to MSGA transmission. If the random access procedure with 2-step RA type is not completed after a number of MSGA transmissions, the UE can be configured to switch to CBRA with 4-step RA type.

Some implementations provide an in-channel NB CAI assisted WB RACH Procedure with WTRU based range estimation. In some cases, the WB transceiver is operational only when it is activated. In some cases, this results in the WB transceiver not consuming energy, or consuming less energy, in an inactive mode. In some cases, aspects of this approach include NB CAI radio link operation for control plane and small data exchange. In some cases, the WB link is enabled only for very high (e.g., above a threshold) data rates and/or very large (e.g., above a threshold) amounts of data exchanges, and/or some measurement procedures. Some implementations include an in-channel NB CAI assisted WB RACH procedure, where the WB RACH follows the NB CAI initial access procedure as shown in FIG. 13.

Figure 13:
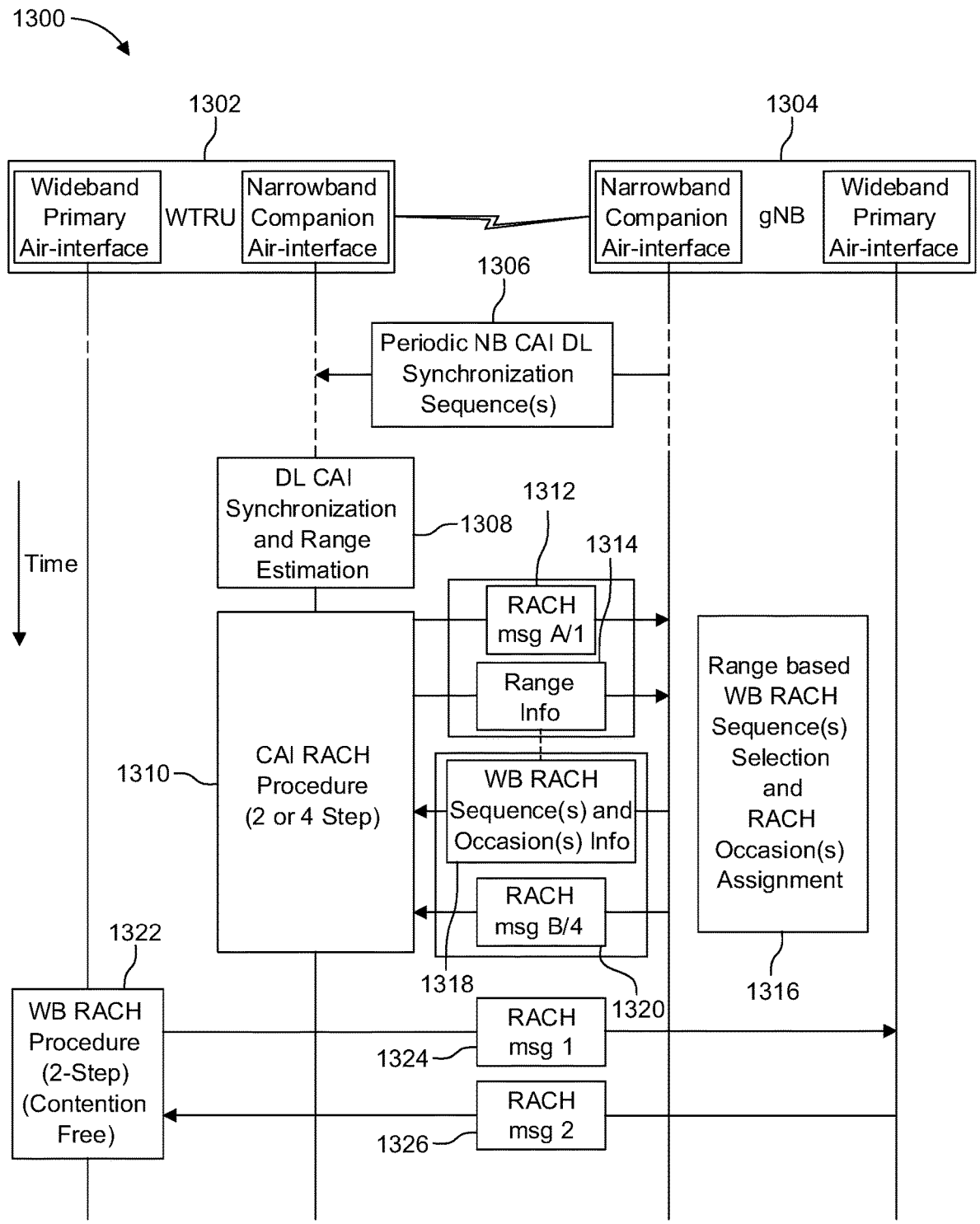
FIG. 13 is a chart illustrating an example in-channel narrowband (NB) companion air interface (CAI) assisted WB random access channel (RACH) Procedure with WTRU based range estimation.

FIG. 13 is a chart illustrating an example in-channel NB CAI assisted WB RACH Procedure 1300 with WTRU based range estimation, involving an example WTRU 1302 and gNB 1304.

gNB 1304 sends one or more periodic NB CAI DL synchronization sequences 1306 to WTRU 1302 over the NB CAI. In some implementations, gNB 1304 deploys periodic downlink synchronization sequences over the NB CAI to enable WTRU 1302 to perform initial access procedures as well as measurement procedures to assist cell selection and re-selection as well as range estimation. In some implementations, the detection of a synchronization sequence facilitates range estimations by WTRU 1302 (i.e., range to gNB 1304 or the corresponding antenna or antennas). In some implementations, the range estimation accuracy is expected to be high (e.g., better than a threshold) e.g., because of the line-of-sight (LoS) link operation and the directional (e.g., highly directional, e.g., above a threshold directionality) transmission in a wide-band high carrier frequency network deployment, in addition to the utilization of a known sequence. In some implementations, the range estimation is based on a received signal strength indicator (RSSI) where the total signal power may be calculated via automatic gain control (AGC) loops settled gain value. In some cases, calculating total signal power based on the RSSI may provide less accuracy due to interference caused by nearby beams.

WTRU 1302 synchronizes the DL CAI and performs range estimation 1308 to estimate the range to gNB 1304. In some implementations, the WTRU may estimate the range, for example, using NB CAI DL synchronization sequences 1306 transmitted (e.g., over the CAI) by the gNB. The gNB may transmit the narrowband DL synchronization sequences (e.g., over the CAI) periodically. The WTRU may detect the periodic narrowband DL synchronization sequences (e.g., over the CAI) and may derive or/and update the UE's range. The information of narrowband DL synchronization sequences (e.g., which sequences will be used, for example, sequence generation method along with IDs need to be used to generate the sequences, etc.), period, slot/symbol/frame numbers, etc., may be communicated to the WTRU.

In some implementations, at the beginning of the NB CAI-assisted WB primary air interface RACH procedure, the WTRU may perform DL synchronization over the narrowband CAI where a mapping between gNB NB CAI beams and DL synchronization sequences may be assumed to be already known at the WTRU; e.g., through system information.

After DL CAI synchronization and rage estimation 1308, WTRU 1302 initiates a CAI RACH procedure 1310 by sending a preamble sequence 1312 to gNB 1304 over the NB CAI. CAI RACH procedure 1310 is a 2-step or 4-step RACH procedure, as appropriate and/or desired. Accordingly, preamble sequence 1312 may be referred to as a RACH MSG1 (for 4-step) or RACH MSGA (for 2-step), as desired.

In some implementations, the WTRU may send the range estimation information obtained by range estimation 1308 to gNB 1304. In some implementations, the estimated range information 1314 may be represented as one of the following options, where the NB CAI RACH occasion is determined based on the prior DL synchronization step: a modified 4-step RACH MSG1 where the preamble is selected from a range-specific pool, where the WTRU may be configured with multiple preambles associated with different ranges by the gNB; a modified 4-step RACH MSG1 where the RACH occasion is selected from a range-specific RACH resources, where the WTRU may be with multiple RACH occasions associated with different ranges; and/or a 2-step RACH MSGA where a new field may be considered to carry the range information. In this example, estimated range information 1314 is sent to gNB 1304 as part of the RACH message (MSG1 or MSGA) that includes preamble sequence 1312. Alternatively, estimated range information may be conveyed to the gNB via a 4-step RACH MSG3 e.g., in a new or repurposed field designated to carry the estimated range information.

In some implementations, after gNB 1304 has obtained the estimated range information 1314, gNB 1304 may select one or more suitable WB RACH sequences and/or one or more WB RACH occasions in step 1316. In some implementations, gNB 1304 may utilize the received range information to select one or more suitable WB RACH sequences for a wideband RACH procedure. Alternatively, the gNB may utilize the detected NB CAI RACH occasion in addition to the received range information to make a suitable selection of the WB RACH sequence(s) for the wideband RACH procedure. In some cases, molecular absorption peaks at certain frequencies are significant as the distance increases. Accordingly, the gNB may select a WB RACH sequence that minimizes the energy transmitted over the absorption peaks while maximizing the energy over the transparency windows, where the absorption is minimal (e.g., below a threshold absorption). The selected sequence energy spans over the channel in use for the wideband communication system.

In some implementations, after the one or more WB RACH sequences are determined and/or selected, the gNB may utilize the detected NB CAI RACH occasion to determine the corresponding set of WB primary air interface beams based on the mapping between NB CAI beams and RACH occasions and the mapping between NB CAI and WB primary air-interface beams. Subsequently, the gNB may select a subset of the determined WB primary air-interface beams based on, e.g., received range information, network deployment, environment characteristics, and/or successful connection history (if any), etc. In another example, the gNB may group the selected RACH occasions in one or more separate groups, where each group may have one or more RACH occasions.

In some implementations, after the one or more WB RACH sequences and occasions, corresponding to the selected WB primary air interface beams, are selected/scheduled by the gNB, WB RACH information 1318, e.g., including WB RACH sequences(s), RACH occasion(s), and/or grouping information (i.e., number of RACH occasions in each group, associated beams in each group, etc.) may be sent to the WTRU 1302. In some implementations, WB RACH information 1318 is sent to WTRU 1302 as part of an NB CAI RACH message 1320.

In some implementations, NB CAI RACH message 1320 may be, include, or correspond to any of the following: a modified/new 4-step RACH MSG4 and/or a modified/new 2-step RACH MSGB. In some implementations, the modified and/or new MSG4 or MSGB includes new fields may be considered to convey the WB RACH information (e.g., selected sequence, and/or scheduled RACH occasion information, etc.)

In some implementations, after the WB RACH information 1318 is sent to WTRU 1302, e.g., in NB CAI RACH MSG 1320. WTRU 1302 may be DL and UL synchronized over the NB CAI. In some implementations, DL synchronization is performed by the WTRU based on a sequence transmitted by the gNB while UL synchronization is performed by the gNB based on a sequence transmitted by a WTRU (which is DL synchronized). In some implementations, WTRU 1302 may be synchronized (e.g., loosely synchronized, e.g., within a threshold synchronization) over the WB primary air interface. In some implementations, the WB TRX obtains coarse synchronization based on the NB CAI synchronization. In some implementations (e.g., in a second part of the procedure), the serving gNB 1304 and served WTRU 1302 may utilize the NB CAI synchronization and exchanged information to facilitate synchronization and connection setup over the WB primary air interface in a WB RACH procedure 1322 for contention-free channel access.

In some implementations, after receiving the WB RACH information 1318 (e.g., indicating one or more sequences and RACH occasions), the WTRU may utilize, for example, a successful connection history to determine the strategy for the transmission of a first WB RACH message 1324 to gNB 1304, and may receive a second WB RACH message 1326 from gNB 1304 in response.

In some implementations, the WTRU may assign weights to different beams associated with the WB based on the successful connections in the past. In some implementations, the WTRU may use one or more scheduled WB RACH occasions in the order of assigned weights to the associated beams to send first WB RACH message 1324. In some implementations, the WTRU may use one or more scheduled WB RACH occasions in a random order (e.g., where the sampled distribution is determined based on the weights assigned to associated beams according to the successful connection history) to send first WB RACH message 1324. In some implementations, the WTRU may transmit the first WB RACH message 1324 using the allocated WB sequence or sequences. In some cases of multiple allocated sequences, the WTRU may select a WB sequence, for example based on the successful connection history or randomly. For example, the WTRU may decide to transmit the first WB RACH message 1324 over all the scheduled WB RACH occasions. In some cases where the second WB RACH message 1326 is configured/scheduled between consecutive scheduled WB RACH occasions, the WTRU may terminate the first WB RACH message 1324 transmission upon the successful reception of the second WB RACH message 1326. Otherwise, in some cases, the WTRU may transmit the first WB RACH message 1324 over all the scheduled WB RACH occasions and monitor for second WB RACH message 1326 corresponding to the scheduled WB RACH occasions.

In another example, when the RACH occasions are grouped, the WTRU may select one or more RACH occasions from each group to send a first WB RACH message or messages. The selection of one or more RACH occasions from each group may be based on the range information, beam-width used for DL/gNB and UL/WTRU WB transmissions (e.g., the DL/gNB beam-width used for WB transmission may be provided to the WTRU along with WB RACH sequence information and RACH occasion information in the second NB CAI RACH message), successful connection history, etc. The WTRU may transmit the first WB RACH message or messages over all the selected WB RACH occasions of the first group and monitor for the second WB RACH messages corresponding to the selected RACH occasions of the first group. If the WTRU does not receive any second RACH message successfully, the WTRU may transmit the first WB RACH message or messages over all the selected WB RACH occasions of the second group and monitor for the second WB RACH messages corresponding to the selected RACH occasions of the second group, and so on.

In some implementations, if the WTRU determines that none of the scheduled WB RACH occasions are viable (e.g., based on a successful connection history), the WTRU may send a request for a specific RACH occasion or occasions activation over the NB CAI. In some implementations, the request may indicate that the none of the allocated RACH occasions may be used or the request may contain one or more DL beam indices associated with WB suitable for the WTRU, which may be determined based on the successful connection history. In another example, after the WTRU fails to receive any random access response (RAR) messages corresponding to the scheduled RACH occasions, the WTRU may decide to send a request to schedule other RACH occasions, for example, all the non-activated WB RACH occasions associated with the NB CAI RACH occasion.

In some implementations, the second WB RACH message may include timing alignment/advance information which the WTRU may use for transmission over the WB. In some implementations, the second WB RACH message may include sequence information which may be used (e.g., detected) by the WTRU to synchronize DL over the WB. In some implementations, the sequence information used in the second WB RACH message may be provided over the NB CAI, for example, along with the selected WB sequence information and RACH occasion information in the second NB CAI RACH message.

In some implementations, the first two messages of the WB RACH procedures may be used for timing and/or frequency synchronization over the WB. The sequence or sequences be preconfigured and uniquely selected for the WTRU, e.g., to facilitate contention-free access to the wireless channel/medium for WB. Further example aspects of the in-channel NB CAI assisted WB RACH procedure include the following.

In some implementations, the NB CAI DL synchronization sequences 1306 are periodically transmitted by gNB 1304. WTRU 1302, by selecting an appropriate raster frequency and receive beam or beams, starts dwelling on the channel while observing threshold crossings on the output of the correlator or correlators. In some implementations, the outputs may be coherently or non-coherently integrated to improve performance against noise/interference. In some implementations, after the one or more threshold crossings are observed, the WTRU detects the synchronization sequence or sequences. In some implementations, the time that the sequence or sequences are detected is used to set the timing of free running clocks to indicate sample, symbol, slot, and frame timings. Accordingly, in some implementations, the NB CAI acquires the synchronization in DL direction in referenced to NB CAI link at the gNB side. However, in some implementations, UL synchronization between the WTRU NB CAI and the gNB NB CAI requires a RACH procedure to take place via correspondingNB CAI entities.

In some implementations, the range estimation 1308 utilizes the correlator output to determine the signal energy level. In some implementations, the energy estimation may use a single correlator output (i.e., the peak value that is above the threshold) or performs integration over multiple threshold-passing to determine a better range estimation. In some implementations, the system is assumed to be directional (e.g., highly directional, e.g., above a threshold directionality), thus the received signal power may be proportional to the distance between the gNB and the WTRU antennas. In some implementations, the WTRU may have a mapping stored a priori between the range estimation and the received signal power or the information may be provided via network.

In some implementations, the WTRU 1302 establishes DL synchronization after detecting the NB CAI DL synchronization sequences 1306, after which, in some implementations, the WTRU, before sending any data messages, establishes UL timing between the WTRU and the gNB NB CAI entities in addition to range estimation 1308.

In some implementations, the WTRU performs CAI RACH procedure 1310 over the NB CAI. In some implementations, the WTRU signals the range information 1314 to gNB 1304 over the NB CAI. In some implementations, the WTRU signals the range information 1314 to gNB as a part of MSGA in a two-step RACH or MSG1 in a four-step RACH (e.g., in a new or repurposed field of the corresponding RACH message 1312).

In some implementations, gNB 1304 determines or selects one or more suitable WB RACH sequences and/or one or more WB RACH occasions in step 1316, e.g., based on molecular absorption and the range information received, and schedules one or more WB RACH occasions based on the detected NB CAI RACH occasion, location history of WTRU 1302, environment characteristics, etc. In some implementations, it is assumed that the molecular absorption-based channel characteristics are known by gNB 1304.

In some implementations, gNB 1304 indicates or provides the one or more suitable WB RACH sequences and/or one or more WB RACH occasions to WTRU 1302. In some implementations, to mitigate beam misalignment between the NB CAI and the WB TRX, gNB 1304 may assign multiple sequences with multiple DL beams to the WTRU 1302. In some implementations, the sequences may be selected (e.g., from a table or bitmap) or derived based on expected individual distances between the corresponding gNB antenna to a particular RACH occasion or occasions. In some implementations, the WTRU 1302 may choose any one of the RACH occasions, or consecutive multiple occasions, or any combination of occasions to transmit its preamble. In some implementations, the assigned sequence or sequences facilitate contention free access due to the directional (e.g., highly directional, e.g., above a threshold directionality) nature of the system. In some implementations, the probability of having two WTRUs at the same range is very low due to the high directionality of the system. In such implementations, a sequence assigned to WTRU 1302 solely based on the range estimate is expected to be unique for that WTRU at the served beam and contention with other WTRUs is not expected.

In some implementations, WTRU 1302 sends a first WB RACH message 1324 as part of WB RACH procedure 1322. In some implementations, the first WB RACH message 1324 includes a RACH preamble that includes an assigned WB molecular absorption-aware sequence or sequences (i.e., sequences selected based on the estimated range and corresponding molecular absorption). In some implementations, the WTRU selectively or sequentially utilizes scheduled WB RACH occasions received in WB RACH information 1318. In some implementations, the WB RACH procedure 1322 is a contention free RACH procedure based on uniquely selected range-dependent sequences. In other words, based on the NB CAI RACH procedure, the WTRU is assigned a unique sequence (which is range-dependent) and hence there is no contention with other WTRUs because the sequence is uniquely assigned to the WTRU 1302. In some implementations, the second RACH message may contain a configured sequence which may be used/detected by the WTRU for the WB DL synchronization purpose In some implementations, WTRU 1302 performs range estimation 1308 by utilizing the correlation results against the NB periodic synchronization sequences. In some implementations, directional systems (e.g., above a threshold directionality) may include LoS links that enable a one-to-one mapping between estimated range and the selected sequence.

Some implementations provide an in-channel NB CAI assisted WB RACH Procedure with gNB based range estimation. For example, in an example approach, the gNB makes range measurements, where the WTRUs transmits NB CAI RACH preamble as part of RACH MSG1 after performing initial synchronization via periodic NB DL synchronization sequences.

Figure 14:
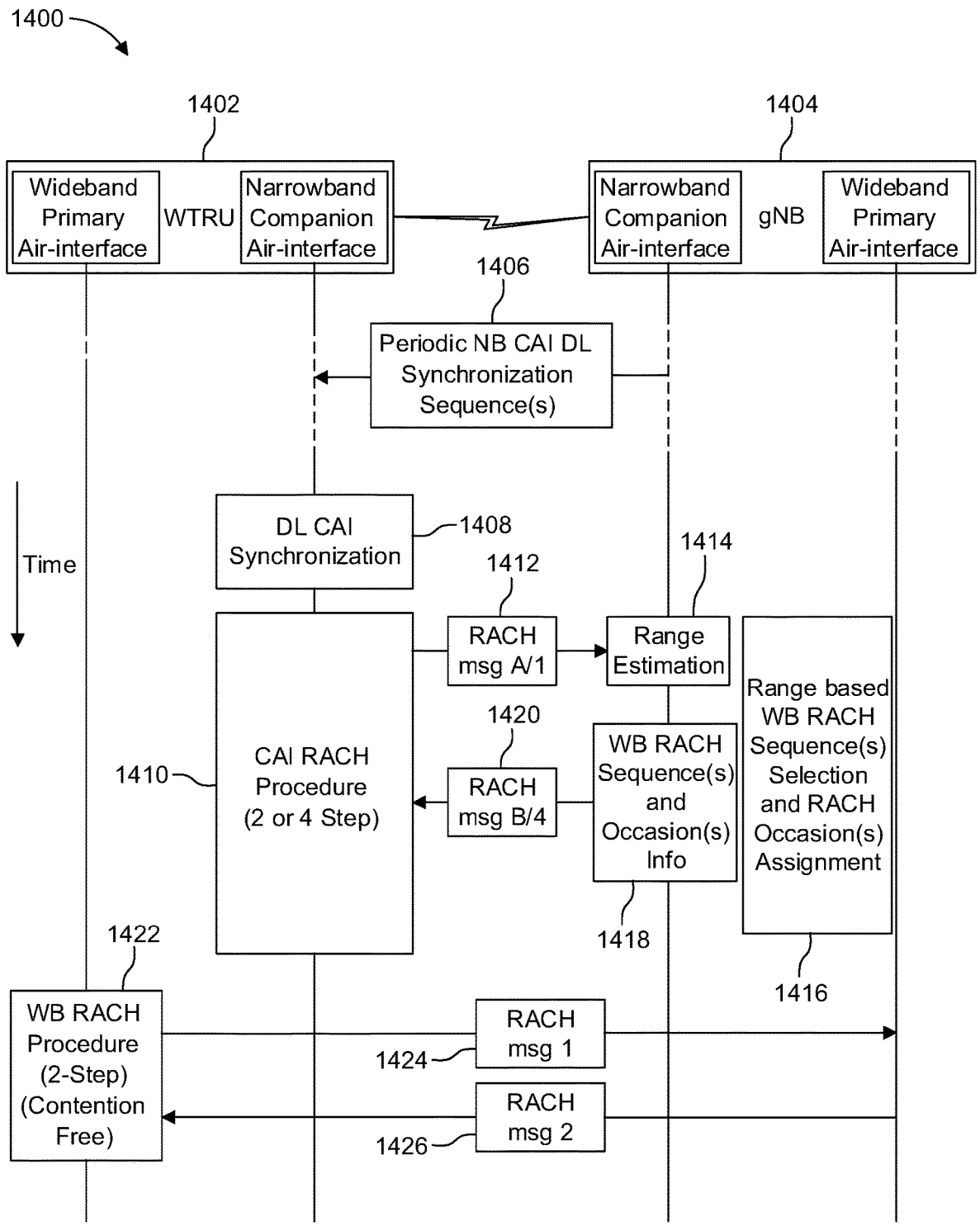
FIG. 14 is a chart illustrating an example in-channel NB CAI assisted WB RACH procedure with gNB based range estimation.

FIG. 14 is a chart illustrating an example in-channel NB CAI assisted WB RACH procedure 1400 with gNB based range estimation, involving an example WTRU 1402 and gNB 1404.

In some implementations, gNB 1404 performs range estimation 1414 based on NB CAI RACH synchronization sequence 1406 by using correlation results against the NB RACH preamble sequence received from WTRU 1402 in a RACH message MSG1 or MSGA (e.g., RACH message 1412), and selects a range-dependent absorption aware WB RACH sequence for WTRU 1402 based on the range estimation. In some implementations, gNB 1404 schedules the WB RACH occasion and sends information 1418 regarding the WB RACH sequence and WB RACH occasion in a RACH message 1420 (e.g., a RACH message MSG2 or MSGB) to WTRU 1402 duringNB CAI RACH 1410. In some implementations, after receiving the RACH message from gNB 1404, WTRU 1402 performs a contention-free WB RACH procedure (e.g., WB RACH procedure 1422).

Further aspects of example in-channel NB CAI assisted WB RACH procedure 1400 are described as follows. WTRU 1402 receives one or more periodic NB synchronization sequences 1406 from gNB 1404 over the NB CAI. In some implementations, the downlink (DL) synchronization sequences are periodically transmitted by the gNBs. In some implementations, the WTRU, by selecting an appropriate raster frequency and receive beam or beams, starts dwelling on the channel while observing threshold crossings on the correlator outputs. In some implementations, the correlator outputs may be coherently or non-coherently integrated to improve performance against noise/interference. In some implementations, after the one or more thresholds passing is observed, the WTRU detects the one or more periodic synchronization sequences 1406. In some implementations, the time that the sequence or sequences are detected is used to set the timing of free running clocks to indicate sample, symbol, slot, and/or frame timings. For example, the WTRU utilizes the separation between the detected peaks (i.e., number of free running clock cycles) to determine sample, symbol, slot, or frame timings based on the periodicity of the synchronization sequences. Accordingly, the WTRU 1402 performs NB DL CAI synchronization 1408 with the NB CAI at the gNB 1404 side. In some implementations, UL synchronization between the WTRU NB CAI and the gNB NB CAI is handled based on a RACH procedure between correspondingNB CAI entities.

WTRU 1402 performs a NB CAI RACH procedure 1410 after NB DL CAI synchronization 1408. In some implementations, WTRU 1402 signals the physical random access channel (PRACH) preamble to gNB 1404 in a RACH message 1412 (e.g., RACH MSG1 or MSGA). gNB performs range estimation 1414 to the WTRU 1402 based on the RACH preamble sequences indicated by or received in RACH message 1412. In some implementations, range estimation 1414 utilizes the correlator output to determine the signal energy level of the RACH preamble sequences. The energy estimation may use a single correlator output (i.e., the peak value that is above the threshold) or performs integration over multiple threshold-passing (i.e., the WTRU may transmit repeated preamble sequences) to determine a better range estimation. In some implementations, the system is assumed to be directional (e.g., above a threshold directionality); accordingly, the received signal power may be assumed to be proportional to the distance between the gNB and the WTRU antennas. In some implementations, the gNB may have a mapping stored a priori between the range estimation and the received signal power and may perform range estimation 1414 based on the mapping.

gNB 1404 determines the best RACH sequences in step 1416 based on molecular absorption and the range information. In this context, the best RACH sequence is a RACH sequence with a BW and/or frequency that mitigates the impact of the molecular absorption in terms of power loss (e.g., to a threshold degree or amount of power loss) based on the estimated range while maintaining a reasonable synchronization accuracy (e.g., to a threshold degree or amount of synchronization accuracy). In some implementations, the RACH sequences may be uniquely selected within the same beam based on the estimated range. In some implementations, the range between two WTRUs illuminated by the same beam may be separate (e.g., uniquely separate) since the range will be different for each one). In some implementations, the probability of having two WTRUs at the same range is very low due to the high directionality of the system. In such implementations, a sequence assigned solely based on the range estimate is expected to be unique for that WTRU at the served beam and contention with other WTRUs is not expected.

gNB 1404 signals the information 1418 regarding sequence and RACH occasion to WTRU in RACH message 1420 over the NB CAI. In some implementations, e.g., to mitigate beam misalignment between the NB CAI and the WB TRX the gNB may assign multiple sequences with multiple DL beams to the WTRU. In some implementations, the sequences may be selected based on expected individual distances between the corresponding gNB antenna to a particular RACH occasion. In some implementations, different (e.g., uniquely) assigned range dependent sequences facilitate contention free access.

WTRU performs WB RACH procedure 1422 based on the sequences and the RACH occasion information received from gNB 1404 in RACH message 1420. In some implementations, WTRU 1402 transmits a first RACH message 1424 (e.g., a RACH MSG1) based on a WB molecular absorption aware sequence or sequences and RACH occasion or occasions received from gNB 1404 in RACH message 1420. In some implementations, the WTRU may choose a RACH occasion or consecutive multiple occasions or any combination of occasions to transmit first RACH message 1424. WTRU 1402 receives a second RACH message 1426 (e.g., a RACH MSG2) from gNB 1404 in response to first RACH message 1424.

In some implementations, after WTRU 1402 receives second RACH message 1426, the WB RACH procedure 1422 is considered or declared successful and further resources allocated for RACH attempts are de-allocated by the gNB. In some implementations, WB RACH procedure 1422 is contention free based on different (e.g., uniquely) selected range dependent sequences. In some implementations, the second RACH message 1426 may include or indicate a configured sequence which may be used by the WTRU for WB DL synchronization.

Some implementations provide activation and deactivation of wideband mode TRX. In some implementations, wideband mode TRX using, for example, the primary air interface, may be activated or de-activated by the WTRU. For example, in some implementations, the wideband mode using the primary air interface may be activated at the WTRU when the WTRU intends to transmit or receive data using the wide bandwidth or entire communication bandwidth. In another example, the active wideband mode using the primary air interface may be de-activated at the WTRU when the WTRU does not intend to transmit or receive any data using the wide bandwidth or entire communication bandwidth for a certain amount of time duration.

Alternatively, in some implementations, the network (e.g., serving gNB) may trigger the activation or deactivation of wideband mode at the WTRU, where the wideband mode may be activated or deactivated at the WTRU, for example, after receiving a command from the network (e.g., serving gNB). In some implementations, the serving gNB may send a command to activate the wideband when there is DL data for the WTRU which may require wideband mode (e.g., requiring a high data rate or the use of wide/entire communication bandwidth) for the transmission. In some implementations, the serving gNB may activate the wideband mode for other purposes, for example, load balancing, where, for example, the serving gNB may determine to activate the wideband based on the buffer status of the WTRU (e.g., in order to create buffer space, the serving gNB may determine to use the wide bandwidth-based DL data transmission to the WTRU). In some implementations, the active wideband mode may be de-activated at the network when the network does not intend to transmit or receive any data using the wide bandwidth or entire communication bandwidth for a certain amount of time.

In some implementations, the activation of wideband mode may refer to initialization of the wideband mode and/or transition of the already initialized wideband mode from a sleep mode to a active and/or connected mode. In some implementations, the de-activation of wideband mode may refer to the transition of the active wideband mode from the active and/or connected mode to the sleep mode.

Some implementations provide WTRU-initiated Wideband Mode Activation. In some implementations, the WTRU may activate the wideband mode, for example, over the primary air interface. For example, a higher layer (e.g., application layer) at the WTRU may send a request/command to a lower layer (e.g., primary air interface's MAC layer) to activate the wideband mode. The WTRU may initiate the procedure of wideband mode activation.

Figure 15:
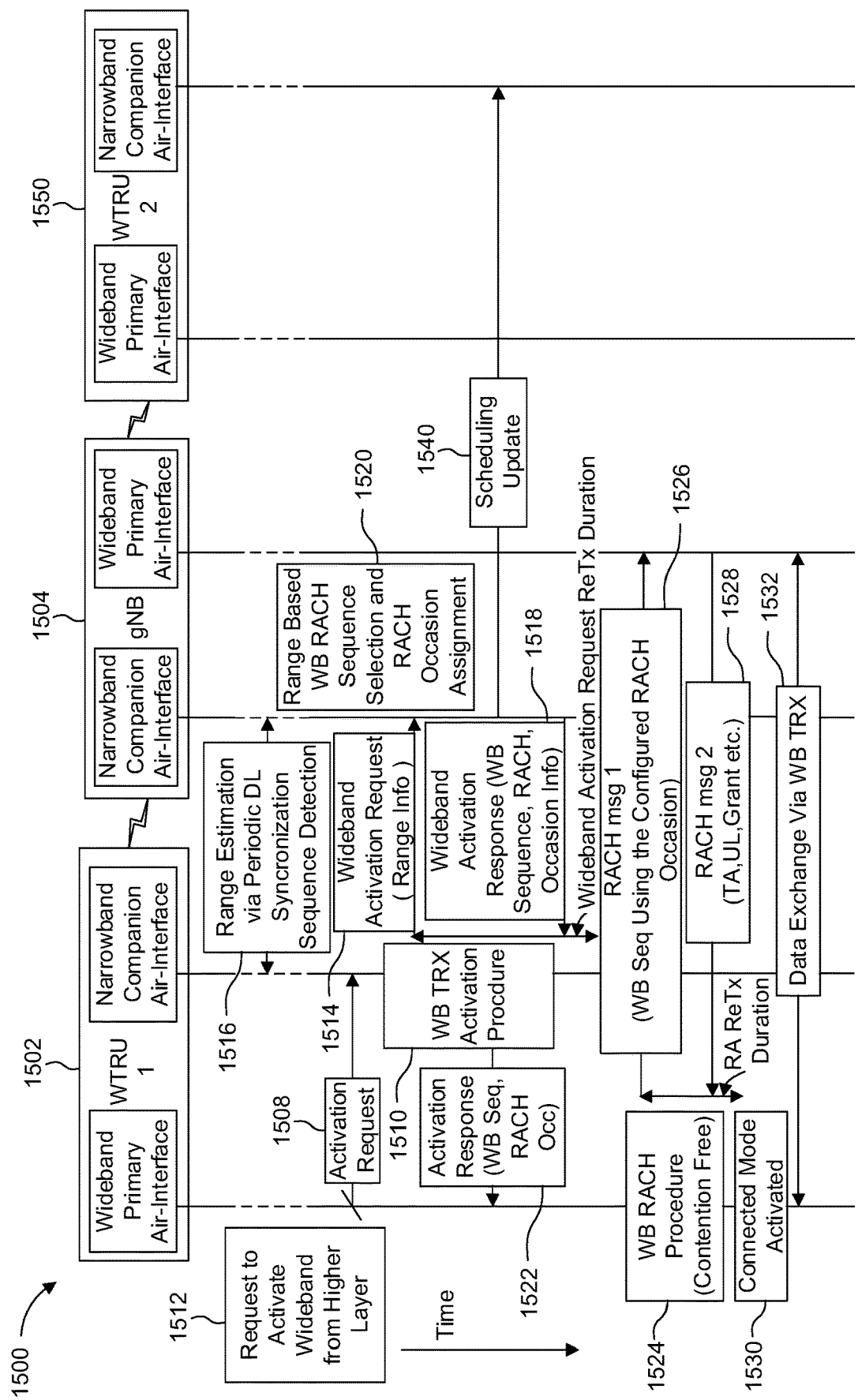
FIG. 15 is a chart illustrating example WTRU-initiated wideband mode activation.

FIG. 15 is a chart illustrating an example WTRU-initiated wideband mode activation procedure 1500 involving an example WTRU 1502, gNB 1504, and WTRU 1550.

In some implementations, a wideband controller (e.g., at the primary air interface's MAC layer) of WTRU 1502 may send an activation message 1508 to a narrowband controller (e.g., at the CAI's MAC layer) of WTRU 1502 to initiate wideband mode activation 1510 (e.g., primary air interface activation). This may be done, example, based on receiving a wideband mode activation request 1512 from a higher layer (e.g., the RRC layer). In some implementations, the WTRU may initiate wideband mode activation 1510 (e.g., primary air interface activation) using the CAI for example, when the CAI narrowband controller receives a wideband mode activation request/command 1508 from the wideband controller. It is noted that activation message 1508 may be considered a request from the perspective that it is sent for relay to the network (to gNB 1504 in this example); alternatively, activation message 1508 may be considered a command that is sent to the narrowband controller to initiate wideband mode activation 1510. Analogous treatment of messages between wideband and narrowband controllers is applicable throughout the examples herein, and such messages are referred to interchangeably as requests or commands.

In some implementations, the WTRU may send a wideband activation request 1514, to the network (e.g., serving gNB 1504) to request wideband mode activation. In some implementations, the wideband activation request 1514 may be sent over the NB CAI.

In some implementations, the wideband activation request 1514 may be transmitted using specific UL messages, e.g., specific MAC-CE or higher layer signaling or specific UL sequences. In some implementations, the wideband activation request message may include information regarding range from WTRU 1502 to gNB 1504 or antennas thereof. In some implementations, the WTRU may determine the range, for example, using a narrowband DL synchronization sequence 1516 transmitted (e.g., over the CAI) by the network (e.g., from or via gNB 1504) to WTRUs in the system (e.g., WTRU 1502 and WTRU 1550). In some implementations, the network may transmit the narrowband DL synchronization sequence 1516 (e.g., over the CAI) periodically. In some implementations, the WTRU may detect the periodic narrowband DL synchronization sequences 1516 (e.g., over the CAI) and may derive or/and update the range. In some implementations, the information of narrowband DL synchronization sequences 1516 (e.g., which sequences will be used, for example, sequence generation method along with IDs need to be used to generate the sequences, etc.), period, slot/symbol/frame numbers, etc., may be communicated to the WTRU.

In another example, the WTRU may send wideband activation request 1514 (e.g., over the CAI) using specific UL sequences (e.g., UL narrowband sequences). In some implementations, the WTRU may be configured with sequences (e.g., UL narrowband sequences dedicated for the purpose of Wideband Activation Request). In some implementations, a dedicated (e.g., WTRU-specific) or a common pool of sequences for all WTRUs to use for wideband activation requests may be configured. In some implementations, if a common pool of sequences for all the WTRUs is configured, the WTRU may select (e.g., randomly) a sequence from the configured sequences. In some implementations, after receiving/detecting a Wideband Activation Request specific sequence from the WTRU, the network (e.g., serving gNB) may estimate the range of the WTRU based on the detection on the Wideband Activation Request specific sequence.

In one example, the WTRU may send the Wideband Activation Request 1514 (e.g., message with range information or specific UL sequence) using the next available UL resource. The configuration of UL/DL resources (e.g., timing information) may communicated to the WTRU. In another example, the WTRU may be configured with dedicated periodic UL resources (e.g., using the UL control channel) over the CAI to send Wideband Activation Requests. Upon determining the need of activation of wideband mode, the WTRU may send the Wideband Activation Request using the next available dedicated periodic UL resource allocated for Wideband Activation Requests. In another example, the WTRU may send a request (e.g., using the UL control channel) to the network over the CAI to grant UL resources (e.g., over the UL control or shared channel) for the UL Wideband Activation Request. The WTRU may send the Wideband Activation Request using the granted UL resources.

In some implementations, after sending a Wideband Activation Request 1514 (e.g., message with range information or specific UL sequence) over the CAI, the WTRU may monitor for a DL response, e.g., Wideband Activation Response 1518, from the network (e.g., serving gNB 1504) over the CAI. In one example, a maximum retransmission duration/window, e.g., Wideband Activation Request Retransmission Duration, may be configured to the WTRU. In some implementations, the WTRU may re-send the Wideband Activation Request 1514 to the network (e.g., serving gNB 1504), for example when after sending a Wideband Activation Request, the WTRU does not receive any Wideband Activation Response over the Wideband Activation Request Retransmission Duration.

In some implementations, the wideband activation response 1518 may include parameters to enable the RACH procedure at the wideband (e.g., primary air interface), which may include, at least one or more of: the information of one or more wideband sequences (e.g., wideband RACH preamble sequences), information of RACH occasion(s) (e.g., time-frequency UL resources to send the RACH preamble sequence), etc. In some implementations, the network may select one or more wideband sequences in step 1520 (e.g., wideband RACH preamble sequences) based on the range info (e.g., received or detected from the WTRU's wideband activation request), carrier frequency, and transparency window related information (e.g., environmental factors such as humidity, dust, molecular structure of the air, etc.). The information of one or more of selected wideband sequences by the network may be included in the wideband activation response 1518, where, for example, Sequence IDs may be communicated. In step 1520, the network may also allocate (e.g., dynamically) UL resources (e.g., RACH occasion(s)) for the WTRU to send a RACH message (e.g., wideband RACH preamble sequence) over the WB air interface. The network may allocate one or more RACH occasions for the WTRU associated with one or more beams of the wideband air interface as explained herein with respect to, e.g., an in-channel NB CAI assisted WB RACH procedure with WTRU based range estimation. In some implementations, the information of granted resources for one or more RACH occasions may be included in the Wideband Activation Response. In some implementations, the network may send a scheduling update message 1540 to other WTRUs (e.g., WTRU 1550), for example when the allocated resources for RACH occasion for a WTRU overlap with any pre-allocated resources to one or more WTRUs, e.g., for other purposes (e.g., DL/UL data/control transfer).

In some implementations, after receiving a wideband activation response 1518 from the network over the CAI, the narrowband controller at the CAI of the WTRU 1502 may send, relay, or indicate the activation response in a message 1522 which may include the wideband activation response information along with the wideband RACH preamble sequence and wideband RACH occasion information) to the wideband controller at the primary air interface of WTRU 1502.

In some implementations, the WTRU may perform a WB RACH procedure 1524 (e.g., a contention-free RACH procedure) using the wideband mode, for example, over the primary air interface, e.g., based on message 1522. In some implementations, if more than one wideband sequence is indicated by the network in the wideband activation response 1518, the WTRU may select one sequence (e.g., randomly). In some implementations, the WTRU may use the selected wideband sequence as RACH preamble sequence to perform the WB RACH procedure 1524. If more than one RACH occasion is allocated, the WTRU may select one or more RACH occasions, e.g., as explained herein with respect to, e.g., an in-channel NB CAI assisted WB RACH procedure with WTRU based range estimation. In some implementations, the WTRU may send a first wideband RACH message 1526 (e.g., a RACH MSG1 or MSGA) including the selected wideband sequence over the allocated UL resources on the selected RACH occasions using the wideband mode over the primary air interface. In some implementations, after sending first wideband RACH message 1526 to the network (e.g., serving gNB), the WTRU may monitor for a second wideband RACH message 1528 (e.g., a RACH MSG2 or MSGB, or RAR), from the network using the wideband mode over the primary air interface.

In some implementations, the WTRU 1502 may be configured with a RAR duration or window. In some implementations, the WTRU may re-send the first wideband RACH message 1526 to the network, for example when after sending first wideband RACH message 1526, the WTRU does not receive second wideband RACH message 1528 during the RAR duration or window.

In some implementations, the second wideband RACH message 1528 from the network may include or indicate one or more of: a timing advance (TA) to be applied for wideband transmissions over the primary air interface, and/or a UL grant for initial data transmission over the wideband interface. In some implementations, the second wideband RACH message 1528 may include or indicate a sequence which may be used (e.g., detected) by the WTRU to achieve DL synchronization over the wideband. In some implementations, the sequence information used in second wideband RACH message 1528 may be provided over the NB CAI, for example, along with the selected wideband sequence and RACH occasion information in wideband activation response 1518.

In some implementations, after receiving the second wideband RACH message 1528, WTRU 1502 may proceed with wideband mode activation 1530 (or transition to the WB connected mode) and the WB primary air interface may be used for UL data transmission and DL data reception 1532.

In some implementations, when the wideband sequence information to be used for the first wideband RACH message 1526 is unavailable at the WTRU (e.g., selection of wideband sequence is not given by the network), the WTRU may select a sequence from a common pool of RACH preamble sequences (e.g., pre-configured to the WTRU, may be range-specific). If the common pool RACH preamble sequences are range specific, the WTRU may select a sequence from the set of sequences associated with the WTRU's range. In this case, the WTRU may perform a 4-step RACH procedure using the wideband mode over the primary air interface.

Some implementations include WTRU-initiated wideband mode de-activation. In some implementations, the WTRU may de-activate the wideband mode, for example, when the WTRU does not have any data to transmit using the wideband mode, or/and the WTRU did not receive (or/and transmit) any data using the wideband mode for a minimum duration, e.g., T_deactivation. The value of such minimum duration (e.g., T_deactivation) may be configured to the WTRU.

Figure 16:
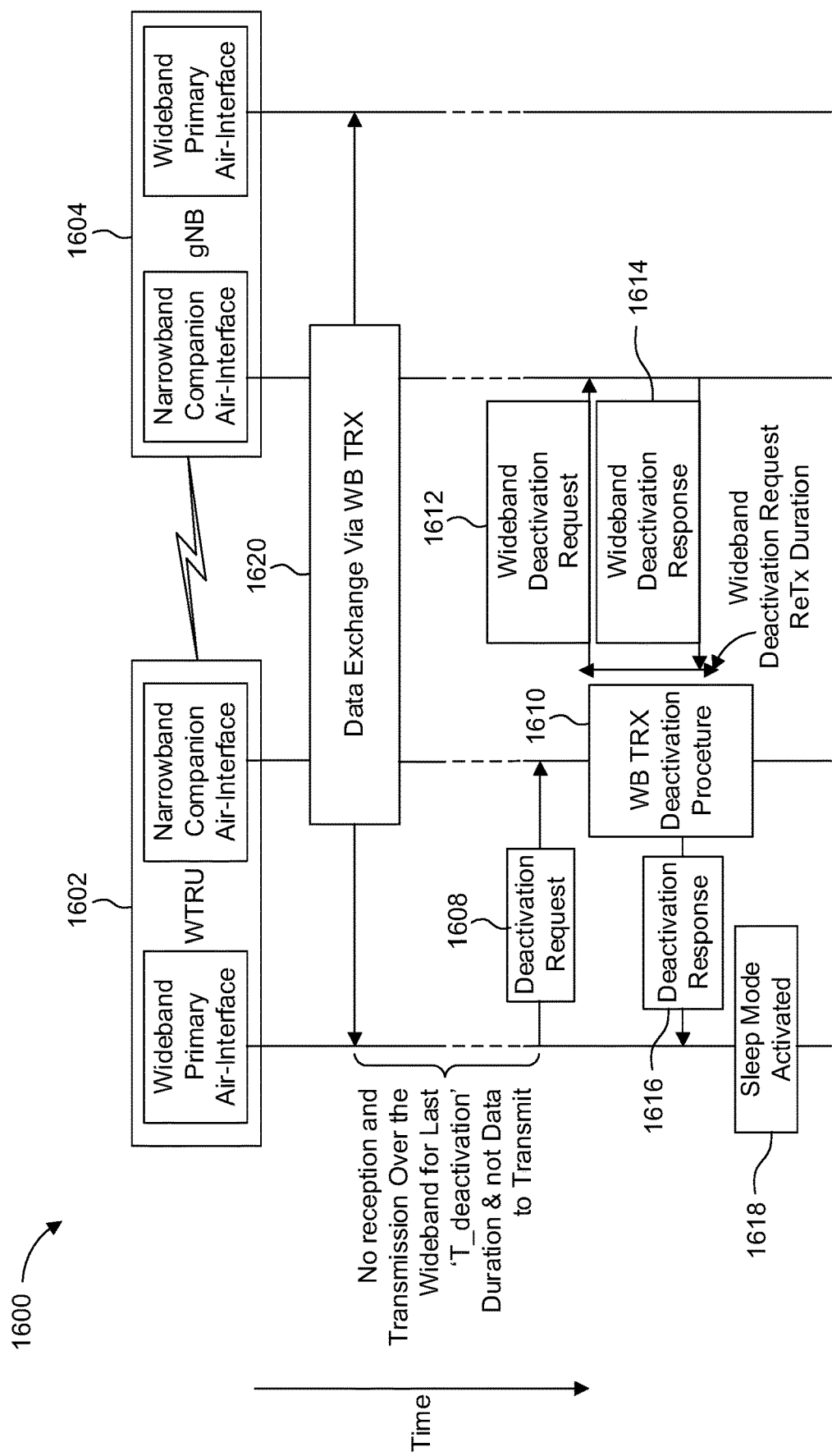
FIG. 16 is a chart illustrating example WTRU-initiated wideband mode de-activation.

FIG. 16 is a chart illustrating an example WTRU-initiated wideband mode de-activation procedure 1600 involving an example WTRU 1602 and gNB 1604.

In some implementations, the wideband controller at the WTRU 1602 (e.g., at the primary air interface's MAC layer) may send a deactivation request/command 1608 to the narrowband controller at WTRU 1602 (e.g., at the CAI's MAC layer) to initiate wideband mode (i.e., primary air interface) de-activation 1610. In some implementations, the wideband controller of WTRU 1602 sends deactivation request/command 1608 after T_deactivation time has elapsed since the WTRU has had any data exchange 1620 with gNB 1604 over the WB primary air interface (e.g., has had data to transmit, and/or has received and/or transmitted any data using the wideband mode.)

In some implementations, the WTRU 1602 may send a wideband deactivation request 1612 to the network using a narrowband transmission over the CAI. In some implementations, the wideband deactivation request 1612 may be transmitted using specific UL messages, e.g., specific MAC-CE or higher layer signaling or specific UL sequences (e.g., dedicated for wideband deactivation requests). In some implementations, the UL resources for wideband deactivation requests may be pre-allocated (e.g., as periodic UL control messages) or may be dynamically granted (e.g., in this case a UL request may be sent to grant the resources).

In some implementations, after sending the wideband deactivation request 1612 to gNB 1604, the WTRU may monitor for a wideband deactivation response 1614 (e.g., a confirmation or acknowledgement) from the gNB 1604 over the CAI. In some implementations, the WTRU 1602 may be configured with a maximum wideband deactivation request retransmission duration or window. In some implementations, the WTRU 1602 may re-send the wideband deactivation request 1612 to gNB 1604, for example, when after sending wideband deactivation request 1612, the WTRU does not receive wideband deactivation response 1614 during the maximum wideband deactivation request retransmission duration or window.

In some implementations, after reception of wideband deactivation response 1614, the narrowband controller of WTRU 1602 may send, relay, or indicate the deactivation response in a message 1616 to the wideband controller of WTRU 1602. In some implementations, the wideband mode may be transitioned to a deactivated mode 1618 (e.g., transitioned to a sleep mode or otherwise turned off) based on message 1616.

In some implementations, the WTRU 1602 may send wideband deactivation request 1612 to gNB 1604 directly using the wideband mode over the primary air interface, and after receiving wideband deactivation response 1614 from gNB 1604, the wideband may be transitioned to sleep mode 1618 or otherwise turned off. In some implementations, wideband deactivation request 1612 may be sent using specific sequences indicating that gNB 1604 should deactivate of the wideband mode for the WTRU 1602.

In some implementations, each data transmission using the wideband mode may include an indication of whether the wideband mode needs to (or should be) deactivated. In some implementations, the indication is in a specific or dedicated field of the transmission (e.g., at the end of the data transmission packet). In some implementations, a specific sequence in the field may be used by the WTRU 1602 to indicate wideband mode deactivation.

Figure 17:
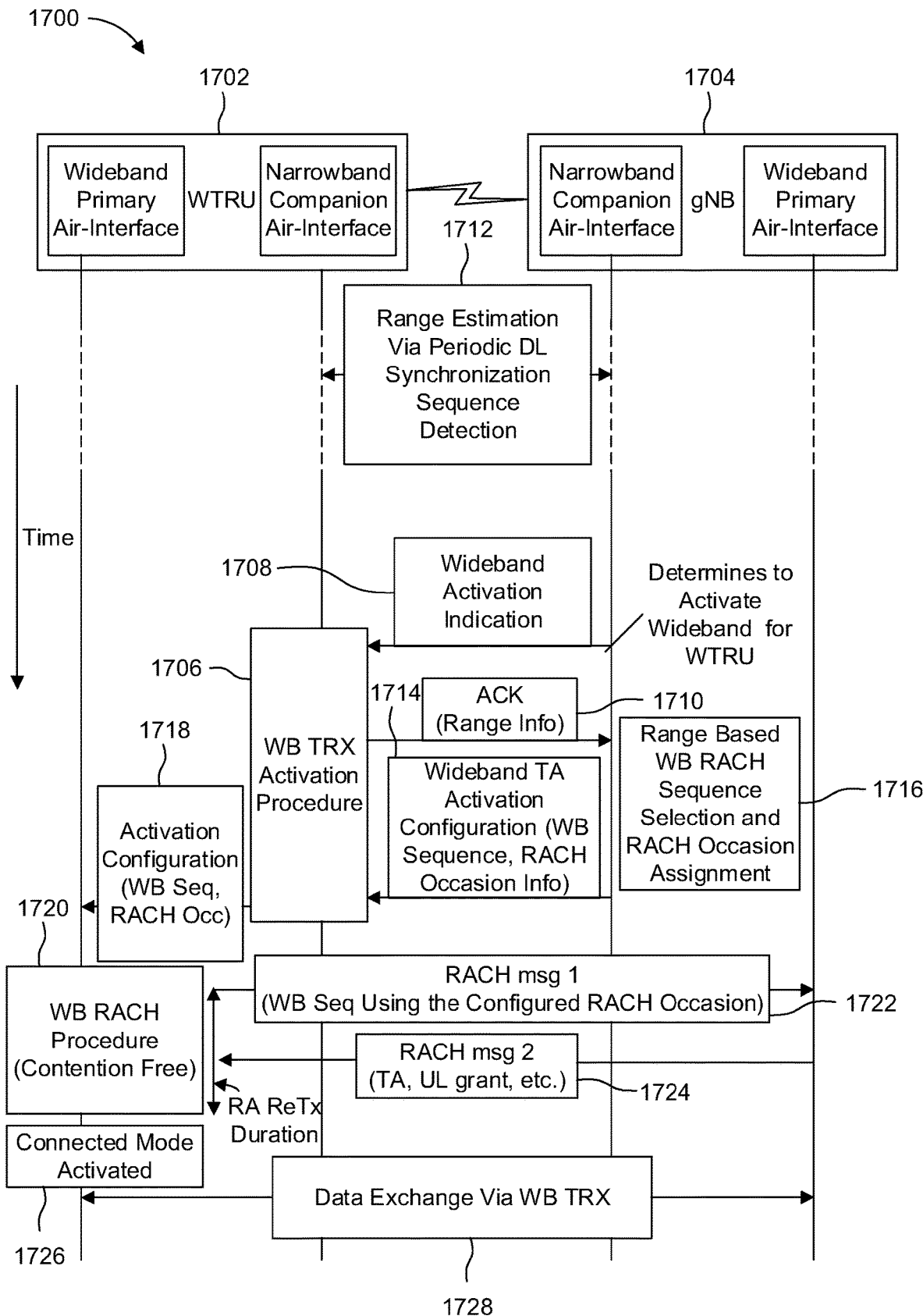
FIG. 17 is a chart illustrating example network-initiated wideband mode activation.

Some implementations provide network-initiated wideband activation. FIG. 17 is a chart illustrating an example network-initiated wideband mode activation procedure 1700 involving an example WTRU 1702 and gNB 1704.

In some implementations, the WTRU 1702 may receive a wideband activation indication 1708, from the network (e.g., serving gNB 1704) over the NB CAI. In some implementations, based on the wideband activation indication 1708, WTRU 1702 performs a WB TRX activation 1706. In some implementations, gNB 1704 may send the wideband activation indication 1708 to the WTRU 1702, for example when the network (e.g., gNB 1704) determines to activate the wideband mode for the WTRU 1702.

In some implementations, after receiving the wideband activation indication 1708, the WTRU 1702 sends a wideband activation response 1710 (e.g., a confirmation or acknowledgement) to the network over the CAI. In some implementations, wideband activation response 1710 includes information regarding a range between WTRU 1702 and gNB 1704, or antennas thereof. In some implementations, WTRU 1702 may determine the range based on periodic narrowband DL synchronization sequences 1712 received from gNB 1704 over the NB CAI, e.g., as discussed elsewhere herein (e.g., with respect to FIG. 13 and its accompanying description.)

In some implementations, after sending wideband activation response 1710, the WTRU may monitor for a wideband activation configuration message 1714 from the network indicating the configuration needed to perform a wideband RACH procedure 1720. After receiving the wideband activation response 1710 from the WTRU, the network may the network may select one or more wideband sequences in step 1716 (e.g., wideband RACH preamble sequences) based on the range info (e.g., received or detected from the WTRU's wideband activation request), carrier frequency, and transparency window related information (e.g., environmental factors such as humidity, dust, molecular structure of the air, etc.). In some implementations, the network may also allocate (e.g., dynamically) UL resources (e.g., for one or more RACH occasions) for the WTRU to send a RACH preamble sequence over the wideband (e.g., over primary air interface). In some implementations, the network may transmit a wideband activation configuration message 1714 indicating an indication of selected wideband sequences (e.g., sequence IDs) and/or granted resources for a WB RACH occasion, to WTRU 1702, over the CAI.

In some implementations, gNB 1704 may send wideband activation configuration message 1714 to WTRU 1702 directly using the NB CAI (e.g., without sending wideband activation indication 1708 to request for the range information from WTRU 1702) along with information regarding wideband sequence and RACH occasions to the WTRU 1702 over the CAI, for example, when gNB 1704 already has the range (e.g., latest) information of the WTRU 1702 (e.g., detected from another UL transmission from the WTRU 1702).

In some implementations, after receiving a wideband activation configuration message 1714 from the network over the CAI, the narrowband controller at the CAI of the WTRU 1702 may send, relay, or indicate wideband activation configuration message 1714 in message 1718 (which may include the wideband activation response information along with the wideband RACH preamble sequence and wideband RACH occasion information) to the wideband controller at the primary air interface of WTRU 1502.

In some implementations, the WTRU 1702 may perform a WB RACH procedure 1720 (e.g., a contention-free RACH procedure) using the wideband mode, for example, over the primary air interface, e.g., based on message 1718. In some implementations, if more than one wideband sequence is indicated by the network in wideband activation configuration message 1714, the WTRU 1702 may select one sequence (e.g., randomly). In some implementations, the WTRU 1702 may use the selected wideband sequence as a RACH preamble sequence to perform the WB RACH procedure 1720. If more than one RACH occasion is allocated, the WTRU may select one or more RACH occasions, e.g., as explained herein with respect to, e.g., an in-channel NB CAI assisted WB RACH procedure with WTRU based range estimation. In some implementations, the WTRU may send a first wideband RACH message 1722 (e.g., a RACH MSG1 or MSGA) including the selected wideband sequence over the allocated UL resources on the selected RACH occasions using the wideband mode over the primary air interface. In some implementations, after sending first wideband RACH message 1722 to the network (e.g., serving gNB), the WTRU may for a second wideband RACH message 1524 (e.g., a RACH MSG2 or MSGB, or RAR), from the network using the wideband mode over the primary air interface.

In some implementations, the WTRU 1702 may be configured with a RAR duration or window. In some implementations, the WTRU may re-send the first wideband RACH message 1722 to the network, for example when after sending first wideband RACH message 1722, the WTRU does not receive second wideband RACH message 1724 during the RAR duration or window.

In some implementations, second wideband RACH message 1724 may include or indicate one or more of: a timing advance (TA) which needs to be applied for wideband transmissions over the primary air interface, and/or a UL grant for initial data transmission over the wideband interface. In some implementations, second wideband RACH message 1724 may include or indicate a sequence which may be used (e.g., detected) by the WTRU to achieve DL synchronization over the wideband. In some implementations, the sequence information used in second wideband RACH message 1724 may be provided over the NB CAI, for example, along with the information of selected wideband sequence and RACH occasion information in wideband activation configuration message 1714.

In some implementations, after receiving second wideband RACH message 1724, WTRU 1702 may be activate or transition to active or connected wideband mode 1726 and the WB primary interface may be used for UL data transmission and DL data reception 1728.

Figure 18:
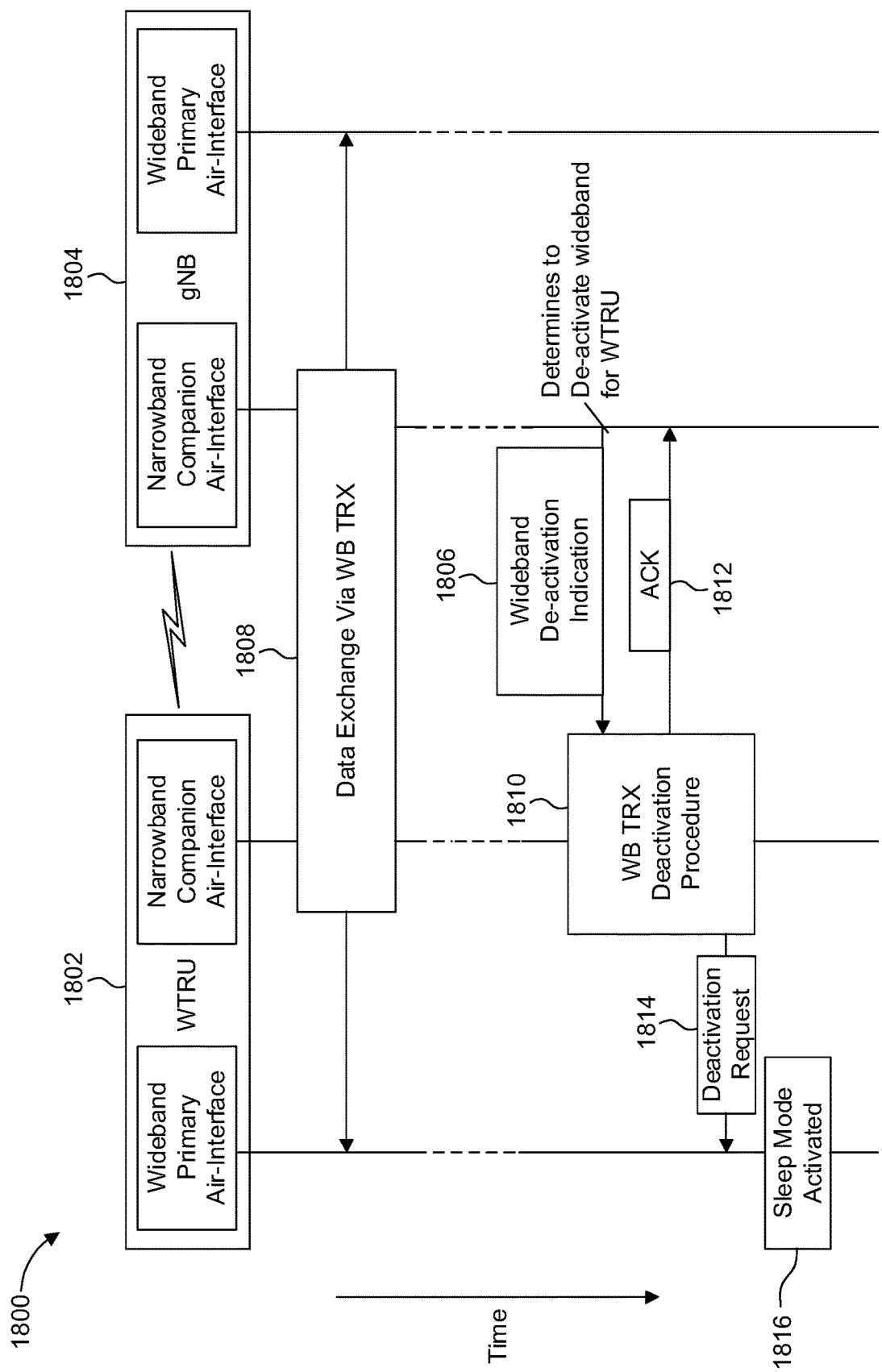
FIG. 18 is a chart illustrating example network-initiated wideband mode de-activation.

FIG. 18 is a chart illustrating an example network-initiated wideband mode de-activation procedure 1800 involving an example WTRU 1802 and gNB 1804.

In some implementations, the WTRU may receive a wideband deactivation indication 1806, from the gNB 1804 over the CAI. In some implementations, gNB 1804 may send the wideband deactivation indication 1806 to WTRU 1802 to initiate the wideband mode de-activation 1810 (e.g., primary air interface de-activation). for example when the network (e.g., serving gNB) determines to de-activate the wideband mode for the WTRU. In some implementations, the NB CAI of gNB 1804 sends wideband deactivation indication 1806 if a threshold amount of time has passed since the gNB 1804 has any data exchange 1808 with WTRU 1802 over the WB primary air interface (e.g., has had data to transmit, and/or has received and/or transmitted any data using the wideband mode.)

In some implementations, after receiving wideband deactivation indication 1806 from gNB 1804 over the CAI, WTRU 1802 may send wideband deactivation response 1812, to gNB 1804 over the CAI. In some implementations, after sending wideband deactivation response 1812 to gNB 1804, the narrowband controller of WTRU 1802 may send, relay, or indicate the deactivation response in a message 1814 to the wideband controller of WTRU 1802. In some implementations, the wideband mode may be transitioned to a deactivated mode 1816 (e.g., transitioned to a sleep mode or otherwise turned off) based on message 1814.

In some implementations, the gNB 1804 may send wideband deactivation request 1806 to WTRU 1802 directly using the wideband mode over the primary air interface. In some implementations, based on wideband deactivation request 1806, the wideband mode may be transitioned to a deactivated mode 1816 (e.g., transitioned to a sleep mode or otherwise turned off) based on message 1814. In some implementations, wideband deactivation request 1806 may be sent by gNB 1804 using specific sequences indicating that the WTRU 1802 should deactivate the wideband mode. include an indication of whether the wideband mode needs to (or should be) deactivated. In some implementations, the indication is in a specific or dedicated field of the transmission (e.g., at the end of the data transmission packet). In some implementations, a specific sequence in the field may be used by the gNB 1604 to indicate wideband mode deactivation.

Some implementations provide dynamic timing advance updating for wideband mode TRX. Dynamic update of timing advance (TA) for the (e.g., active) wideband mode TRX, e.g., Primary Air Interface, may be performed by the WTRU. For example, the WTRU may initiate the procedure of updating the TA based on the range estimations. Alternatively, the network (e.g., serving gNB) may trigger the update of TA for the wideband mode at the WTRU where the procedure of updating the TA may be triggered at the WTRU, for example, after receiving a command from the network (e.g., serving gNB).

Figure 19:
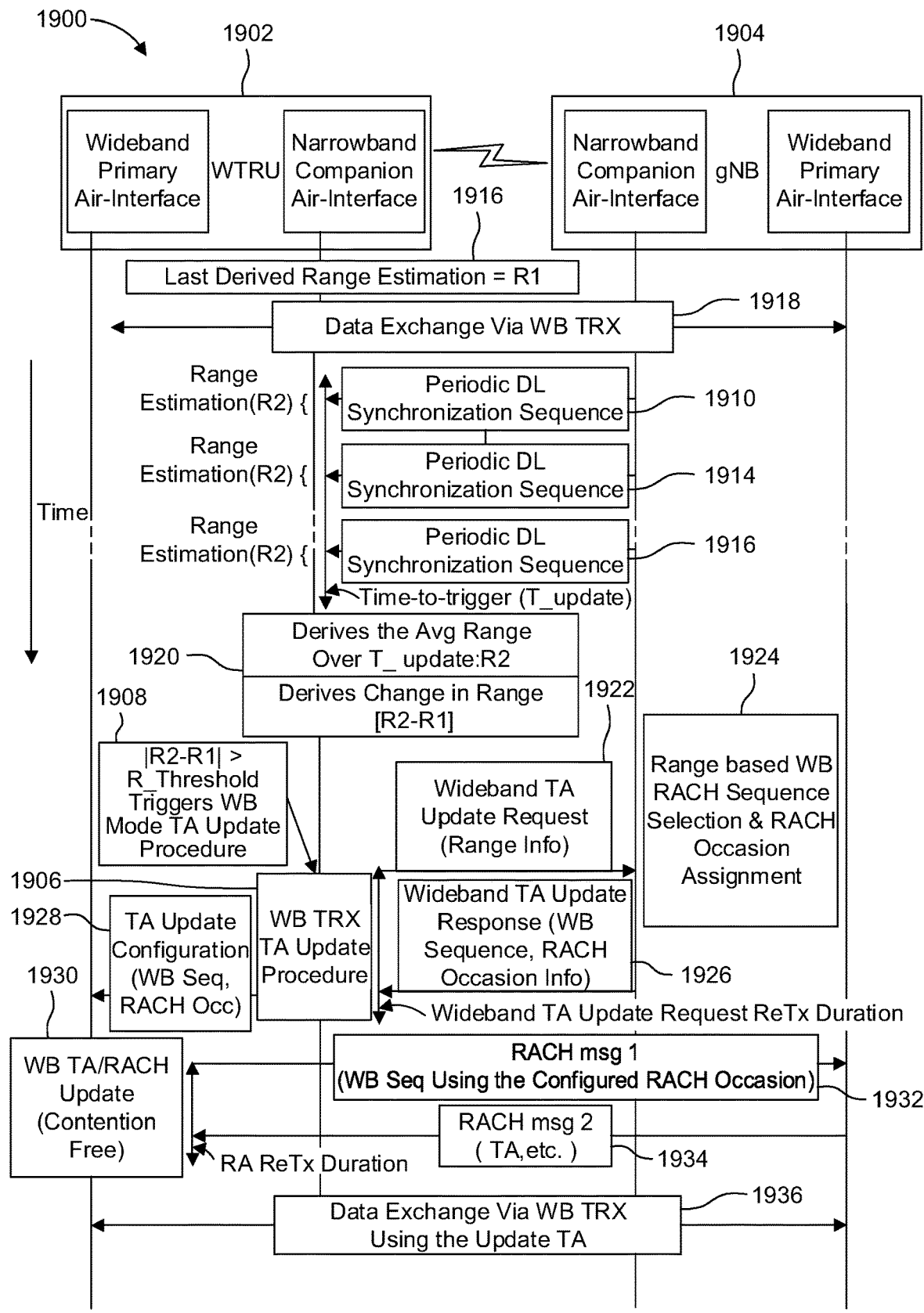
FIG. 19 is a chart illustrating an example WTRU-initiated TA update for the wideband mode.

Some implementations provide WTRU-initiated wideband mode timing advance updating. FIG. 19 is a chart illustrating an example WTRU-initiated TA update procedure 1900 for the wideband mode, involving an example WTRU 1902 and gNB 1904.

The WTRU may determine to initiate the TA update 1906 for the wideband mode (e.g., primary air interface). For example, the WTRU may determine the need to initiate the TA update 1906 for the wideband mode based on an event.

An event for the TA update of the wideband mode may be configured to the WTRU. For example, an event may be configured based on the range estimations at the WTRU during a data exchange via WB TRX 1918. The WTRU may determine the range, for example, using one or more periodic narrowband DL synchronization sequences transmitted (e.g., over the CAI) by the network.

In example procedure 1900, the triggering event 1908 for the TA update 1906 of the wideband mode is where the range estimation has varied by a triggering threshold (e.g., R_threshold). In some implementations, the WTRU may initiate the TA update 1906 for the wideband mode using the CAI. In this example, the WTRU determines that the range estimation has varied by a triggering threshold where the absolute difference between a current (e.g., recent) range estimation and a previous estimation of the range exceeds a threshold distance. Here, the WTRU is configured to monitor multiple range estimations 1910, 1912, 1914 (or range estimations over a configured time period, for example, "time-to-trigger", e.g., T_update) and derive 1920 a range value based on the multiple range estimations 1910, 1912, 1914 (e.g., as the average of range estimations 1910, 1912, 1914). If the derived value based on multiple range estimations 1910, 1912, 1914 varies from a previously derived value 1916 of the range estimation by a triggering threshold, then the event triggering condition may be considered as fulfilled. The value of the triggering threshold (e.g., R_threshold), time-to-trigger, or/and number of multiple estimations may be communicated to the WTRU by the network.

In some implementations, the WTRU may initiate the TA update procedure 1906 for the wideband mode, for example when the WTRU determines that there is a need to update the TA for the wideband mode TRX. The WTRU may send a request, e.g., Wideband TA Update Request 1922, to the network (e.g., serving gNB) to request to update the TA for the wideband mode (e.g., primary air interface). The Wideband TA Update Request may be sent over the CAI.

In some implementations, wideband TA update request 1922 may be transmitted using specific UL messages, e.g., specific MAC-CE or higher layer signaling or specific UL sequences. The Wideband TA Update Request message may include range information, such as the recently derived range information. In another example, the WTRU may send the Wideband TA update Request 1922 (e.g., over the CAI) using specific UL sequences (e.g., UL narrowband sequences). The WTRU may be configured with sequences (e.g., UL narrowband sequences dedicated for the purpose of Wideband TA Update Request 1922). A dedicated (e.g., WTRU-specific) or a common pool of sequences for all the WTRUs for the purpose of Wideband TA Update Request may be configured. If a common pool of sequences for all the WTRUs is configured, the WTRU may select (e.g., randomly) a sequence from the configured sequences. After receiving/detecting a Wideband TA Update Request 1922 specific sequence from the WTRU, the network (e.g., serving gNB) may estimate 1924 the range of the WTRU based on the detection on the Wideband TA Update Request specific sequence.

In some implementations, the configuration and determination of UL resources to send Wideband TA Update Request may be performed, e.g., in a similar manner as described for the Wideband Activation Request elsewhere herein, e.g., with respect to FIG. 13 and its accompanying description.

In some implementations, after sending a Wideband TA Update Request 1922 (e.g., message with range information or specific UL sequence) over the CAI, the WTRU may monitor for a DL response, e.g., Wideband TA Update Response 1926, from the network (e.g., serving gNB) over the CAI. In one example, a maximum retransmission duration/window, e.g., Wideband TA Update Request Retransmission Duration, may be configured to the WTRU. The WTRU may re-send the Wideband TA Update Request 1922 to the network (e.g., serving gNB), for example when after sending a Wideband TA Update Request 1922, the WTRU does not receive any Wideband TA Update Response 1926 during the Wideband TA Update Request Retransmission Duration.

The Wideband TA Update Response 1926 may contain the parameters to enable the RACH procedure update at the wideband (e.g., primary air interface), which may include, at least one or more of: the information of one or more wideband sequences (e.g., sequence IDs for the wideband RACH preamble sequences), information of RACH occasion(s) (allocated resources for the wideband RACH preamble sequence transmission from the WTRU), etc. The network may select one or more wideband sequences by using the range info (e.g., received or detected from the WTRU's Wideband TA Update Request), carrier frequency, and transparency window related information (e.g., environmental factors such as humidity, dust, molecular structure of the air, etc.). The information of one or more of selected wideband sequences by the network may be included in the Wideband TA Update Response, where, for example, Sequence IDs may be communicated. The network may allocate (e.g., dynamically) UL resources (e.g., for one or more RACH occasions) for the WTRU to send a RACH message over the wideband (e.g., over primary air interface).

After receiving a Wideband TA Update Response 1926 from the network over the CAI, the narrowband controller at the CAI of the WTRU may send/relay the response 1928 (e.g., Wideband TA Update Response) to the wideband controller at the primary air interface. After that the WTRU may perform RACH procedure 1930 (e.g., contention-free RACH procedure) using the wideband mode, for example, over the primary air interface to receive the updated/recent TA from the network.

The RACH procedure 1930 using the wideband mode may be performed in a manner as described elsewhere herein, e.g., with respect to FIG. 13 and its accompanying description. The WTRU may transmit a RACH MSG1 1932 to the gNB using the configured RACH occasion. The WTRU may receive the value of the updated TA in the RACH message 2 1934 from the network.

After receiving the RACH message 2 1934, the WTRU may start applying the updated TA (received in RACH message 2) for the transmissions 1936 performed using the wideband mode (e.g., over the primary air interface).

In another example, the WTRU may perform the wideband TA update procedure directly using the active wideband mode (e.g., over the primary air interface). The WTRU may send a Wideband TA Update Request (e.g., message with range information or specific UL sequence) to the network or/and may receive the associated Wideband TA Update Response (e.g., with the information of wideband sequence and the RACH occasions) from the network using the wideband mode (e.g., over the primary air interface). Then the WTRU may perform wideband RACH procedure using configuration received in Wideband TA Update Response to receive the updated/recent TA from the network.

Figure 20:
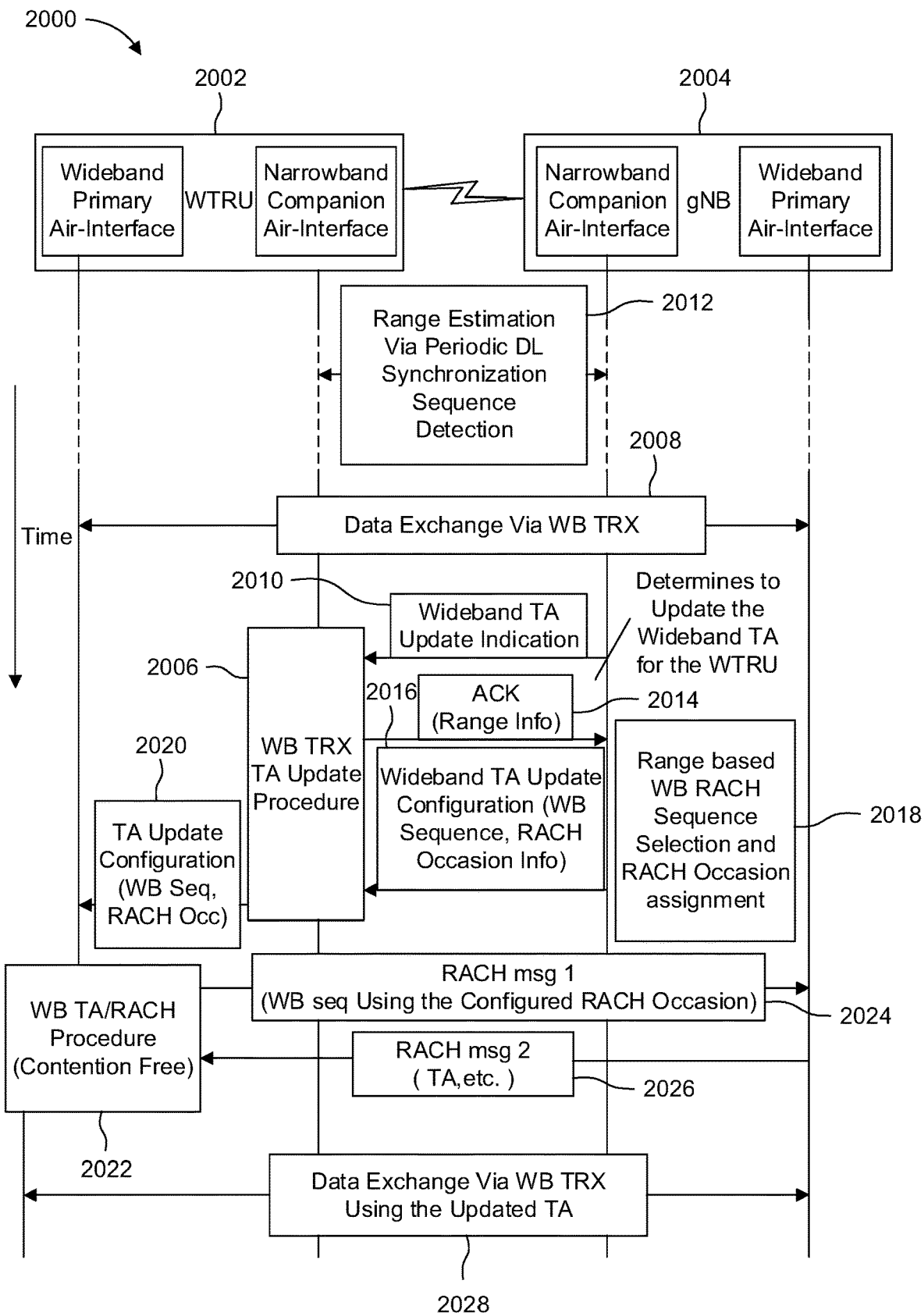
FIG. 20 is a chart illustrating an example network-initiated TA update for the wideband mode.

Some implementations include a network-initiated wideband mode timing advance update. FIG. 20 is a chart illustrating an example network-initiated TA update procedure 2000 for the wideband mode, involving an example WTRU 2002 and gNB 2004.

The gNB may determine to initiate a TA update procedure 2006 for the wideband mode (e.g., primary air interface). For example, after data exchange 2008 on the WB primary air interface between WTRU 2002 and gNB 2004, the WTRU may receive a command, e.g., Wideband TA Update Indication 2010, from the network (e.g., serving gNB) over the CAI. The network may send the Wideband TA Update Indication 2010 to the WTRU, for example when the network (e.g., serving gNB) determines that there is need to update the TA for the wideband mode (e.g., over the primary air interface). In one example, the network may determine the need of TA update for the wideband mode using the available range estimations of the WTRU at the network (e.g., detected from one or more of UL transmissions from the WTRU). The network may determine the need of TA update based on the variations in the range estimations for the WTRU, e.g., by following the similar methods as described in the examples for the WTRU elsewhere herein. For example, the WTRU 2002 may estimate the range to the gNB based on one or more periodic DL synchronization sequences 2012 received from the gNB and may send the range to the gNB on a UL transmission of data exchange 2008 on the WB primary air interface between WTRU 2002 and gNB 2004. In another example, the network may determine the need of TA update for the wideband mode using the quality of the data reception with the wideband mode, for example, if the data receiving from the WTRU using the wideband mode is experiencing/generating (e.g., significant) interference from/to other receptions (e.g., from the other WTRUs), the network may decide to update the TA for the wideband mode of the WTRU.

In some implementations, after receiving the Wideband TA Update Indication, the WTRU may send a response (e.g., Wideband TA Update ACK 2014) to the network which may include range information over the CAI. The WTRU 2002 may determine the range using the periodic narrowband DL synchronization sequences 2012, e.g., as discussed elsewhere herein, e.g., with respect to FIG. 13 and its accompanying description.

In some implementations, after sending the Wideband TA Update ACK 2014, the WTRU may monitor for a Wideband TA Update Configuration message 2016 from the network containing the configuration needed to perform the wideband RACH procedure. After receiving the Wideband TA Update ACK from the WTRU, the network may determine 2018 one or more wideband sequences using the range info, carrier frequency, and transparency window related information (e.g., environmental factors such as humidity, dust, molecular structure of the air, etc.). The network may also allocate (e.g., dynamically) UL resources (e.g., for one or more RACH occasions) for the WTRU to send a RACH message over the wideband (e.g., over primary air interface). The network may transmit a Wideband TA Update Configuration 2016 message containing at least one or more of: the information of selected wideband sequences (e.g., sequence IDs), granted resources for RACH occasion, to the WTRU over the CAI.

In another example, the network may directly send a Wideband TA Update command 2016 (e.g., without the need of sending a Wideband TA Update Indication to request for the range information from the WTRU) along with the information of one or more wideband sequence and one or more RACH occasions to the WTRU over the CAI, for example, when the network already has the range (e.g., latest) information of the WTRU (e.g., detected from another UL transmission from the WTRU).

In some implementations, the WTRU 2002, after receiving the Wideband TA Update Configuration 2016 from the network over the CAI, may send the configuration 2020 to the wideband controller. The wideband controller, after receiving the Wideband TA Update Configuration, may initiate the wideband RACH procedure 2022 over the primary air interface to receive the value of the updated TA from the network, e.g., by following a procedure described elsewhere herein, e.g., with respect to FIG. 13 and its accompanying description. The WTRU may transmit a RACH MSG1 2024 to the gNB using the configured RACH occasion. The WTRU may receive the value of the updated TA in the RACH message 2 2026 from the network.

In some implementations, after receiving the RACH message 2 2026, the WTRU may start applying the updated TA (e.g., received in RACH message 2) for the transmissions 2028 performed using the wideband mode (e.g., over the primary air interface).

In another example, the wideband TA update procedure may be performed directly using the active wideband mode (e.g., over the primary air interface). The reception of Wideband TA Update Indication from the network, transmission of ACK with the range information to the network, or/and the reception of the Wideband TA Update Configuration (e.g., with the information of wideband sequence and the RACH occasions) from the network may be performed using the wideband mode (e.g., over the primary air interface). Then the WTRU may perform wideband RACH procedure using configuration received in Wideband TA Update Configuration to receive the updated/recent TA from the network.

Embodiments

1. An embodiment including an in-channel NB CAI assisted WB RACH procedure with WTRU based range estimation.

2. The embodiment as in embodiment 1, further comprising the WTRU detecting periodic NB DL synchronization sequences.

3. The embodiment as in any preceding embodiment, further comprising the WTRU estimating range information based on measuring the periodic NB DL synchronization sequences, and determining an NB CAI RACH occasion.

4. The embodiment as in any preceding embodiment, further comprising the WTRU performing a NB CAI RACH procedure, wherein the WTRU sends the range information to the gNB.

5. The embodiment as in any preceding embodiment, further comprising the gNB selecting or determining at least one WB sequence based on molecular absorption and the range information.

6. The embodiment as in any preceding embodiment, further comprising the gNB determining a set of WB RACH occasions based on the NB CAI RACH occasion, the WTRU's location history, and/or environment characteristics.

7. The embodiment as in any preceding embodiment, further comprising the gNB signaling the selected or determined WB sequence and information regarding the set of WB RACH occasions to the WTRU.

8. The embodiment as in any preceding embodiment, wherein at least one of the selected or determined WB sequences is used for contention free access.

9. The embodiment as in any preceding embodiment, further comprising the WTRU performing a WB RACH procedure.

10. The embodiment as in any preceding embodiment, wherein the RACH preamble utilizes an assigned WB molecular absorption aware sequence or sequences.

11. The embodiment as in any preceding embodiment, wherein the RACH preamble selectively or sequentially utilizes the scheduled WB RACH occasions based on location information, environment characteristics.

12. An embodiment including an in-channel NB CAI assisted WB RACH procedure with gNB based range estimation.

13. The embodiment as in embodiment 12, further comprising the WTRU detecting periodic NB DL synchronization sequences.

14. The embodiment as in any one of embodiments 12-13, further comprising the WTRU performing a NB CAI RACH procedure by sending a NB PRACH preamble sequence to the gNB.

15. The embodiment as in any one of embodiments 12-14, further comprising the gNB estimating a range using the NB RACH preamble sequence.

16. The embodiment as in any one of embodiments 12-15, further comprising the gNB selecting a WB sequence based on molecular absorption and the range.

17. The embodiment as in any one of embodiments 12-16, further comprising the gNB signaling the selected WB sequence and information regarding a RACH occasion info to the WTRU (e.g., where the selected WB sequence facilitates contention free access).

18. The embodiment as in any one of embodiments 12-17, further comprising the WTRU performing a WB RACH procedure (e.g., where a RACH preamble uses a WB molecular absorption aware sequence; and/or a contention free approach).

19. An embodiment including a method for activation and deactivation of a wideband mode TRX.

20. The embodiment as in embodiment 19, further comprising the WTRU determining and/or updating range information based on detected narrowband periodic DL synchronization sequences.

21. The embodiment as in any one of embodiments 19-20, further comprising, on a condition that a WB mode needs to be activated for data transmission/reception, the WTRU sending the range information (e.g., via a WB Activation Request) to a network (e.g., a serving gNB, or via a serving gNB) over a CAI.

22. The embodiment as in any one of embodiments 19-21, further comprising, responsive to receiving a WB Activation Indication from the network over the companion air interface, the WTRU sending the range information to the network over the CAI.

23. The embodiment as in any one of embodiments 19-22, further comprising the network determining or selecting one or more WB sequences for the WTRU based on the range information, a carrier frequency, and transparency window related information (e.g., environmental factors such as humidity, dust, molecular structure of the air, etc.).

24. The embodiment as in any one of embodiments 19-23, further comprising the WTRU receiving a WB Activation Response/Configuration from the network which includes information regarding at least one WB RACH preamble sequence selected by the network and/or at least one allocated RACH occasion.

25. The embodiment as in any one of embodiments 19-24, further comprising the WTRU sending a RACH message 1 by sending one of the at least one WB preamble sequence over one of the at least one allocated RACH occasion using the WB mode.

26. The embodiment as in any one of embodiments 19-25, further comprising the WTRU activating the WB mode (e.g., transitioning to a connected mode) after receiving a RACH message 2 using the WB which includes information regarding a timing advance (TA) and/or an UL grant.

27. The embodiment as in any one of embodiments 19-26, further comprising, on a condition that WB mode is not used for data transmission for a threshold amount of time, the WTRU sending a WB Deactivation Request to the network over the CAI.

28. The embodiment as in any one of embodiments 19-27, further comprising the WTRU deactivating the WB mode (e.g., transitioning to sleep mode) responsive to receiving a WB Deactivation ACK from the network over the CAI.

29. The embodiment as in any one of embodiments 19-28, further comprising the WTRU deactivating the WB mode (e.g., transitioning to sleep mode) after receiving a WB Deactivation Indication/Command from the network over the CAI.

29. An embodiment including a method for dynamic TA updating of a WB mode TRX.

30. The embodiment as in embodiment 29, further comprising the WTRU determining range information based on detected periodic narrowband DL synchronization sequences.

31. The embodiment as in any one of embodiments 29-30, further comprising, on a condition that a change in the range exceeds a configured threshold, the WTRU initiating a TA update procedure for the WB mode by sending the range information (e.g., via a WB TA update Request) to the network (e.g., a serving gNB, or via a serving gNB) over the CAI.

32. The embodiment as in any one of embodiments 29-31, further comprising, responsive to receiving a WB TA Update Indication from the network over the CAI, the WTRU sending the range information to the network over the CAI.

33. The embodiment as in any one of embodiments 29-32, further comprising the network determining at least one WB sequence for the WTRU based on the range information, a carrier frequency, and transparency window related information (e.g., environmental factors such as humidity, dust, molecular structure of the air, etc.).

34. The embodiment as in any one of embodiments 29-33, further comprising the WTRU receiving a WB TA Update Response/Configuration from the network which includes information regarding at least one WB RACH preamble sequence selected by the network and/or at least one allocated RACH occasion.

35. The embodiment as in any one of embodiments 29-34, further comprising the WTRU sending a RACH message 1 by sending one of the at least one configured WB sequence over one of the at least one RACH occasion using the wideband mode.

36. The embodiment as in any one of embodiments 29-30, further comprising, responsive to receiving a RACH message 2 using the WB mode which includes information regarding TA, the WTRU updating the TA for transmissions performed using the WB mode.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented in a wireless transmit-receive unit (WTRU), the method comprising:
   receiving a periodic downlink (DL) synchronization sequence on a narrowband air interface;
   transmitting, in a first random access channel (RACH) procedure for the narrowband air interface, to a base station, information regarding a range between the WTRU and the base station;
   receiving, in the first RACH procedure, from the base station, information indicating a RACH sequence for a wideband transceiver (WB TRX) and information indicating at least one RACH occasion for a second RACH procedure, wherein the RACH sequence for the WB TRX is based on a molecular absorption characteristic and the range; and
   transmitting the RACH sequence for the WB TRX, in the second RACH procedure, during a first RACH occasion of the at least one RACH occasion for the second RACH procedure.

2. The method of claim 1, wherein the range is indicated by a field of a RACH message, by a preamble selected from a pool of preambles, or by a RACH occasion selected from a pool of RACH occasions.

3. The method of claim 1, wherein the first RACH procedure comprises a 4-step RACH procedure or a 2-step RACH procedure.

4. The method of claim 1, further comprising transmitting the RACH sequence for the WB TRX, during a second RACH occasion of the at least one RACH occasion for the second RACH procedure, on a condition that a RACH response is not received, in a configured amount of time, from the base station responsive to the RACH sequence for the WB TRX transmitted during the first RACH occasion.

5. The method of claim 1, further comprising estimating the range between the WTRU and the base station.

6. The method of claim 1, further comprising estimating the range between the WTRU and the base station based on a measurement of the periodic DL synchronization sequence.

7. The method of claim 1, further comprising receiving a plurality of periodic DL synchronization sequences on the narrowband air interface and estimating the range between the WTRU and the base station based on the plurality of periodic DL synchronization sequences.

8. A wireless transmit-receive unit (WTRU) comprising:
   circuitry configured to receive a periodic downlink (DL) synchronization sequence on a narrowband air interface;
   circuitry configured to, in a first random access channel (RACH) procedure for the narrowband air interface:
      transmit, to a base station, information regarding a range between the WTRU and the base station, and
      receive, from the base station, information indicating a RACH sequence for a wideband transceiver (WB TRX) and information indicating at least one RACH occasion for a second RACH procedure, wherein the RACH sequence for the WB TRX is based on a molecular absorption characteristic and the range; and
   circuitry configured to, in the second RACH procedure, transmit the RACH sequence for the WB TRX during a first RACH occasion of the at least one RACH occasion for the second RACH procedure.

9. The WTRU of claim 8, wherein the range is indicated by a field of a RACH message, by a preamble selected from a pool of preambles, or by a RACH occasion selected from a pool of RACH occasions.

10. The WTRU of claim 8, wherein the first RACH procedure comprises a 4-step RACH procedure or a 2-step RACH procedure.

11. The WTRU of claim 8, further comprising circuitry configured to transmit the RACH sequence for the WB TRX, during a second RACH occasion of the at least one RACH occasion for the second RACH procedure, on a condition that a RACH response is not received, in a configured amount of time, from the base station responsive to the RACH sequence for the WB TRX transmitted during the first RACH occasion.

12. The WTRU of claim 8, further comprising circuitry configured to estimate the range between the WTRU and the base station.

13. The WTRU of claim 8, further comprising circuitry configured to estimate the range between the WTRU and the base station based on a measurement of the periodic DL synchronization sequence.

14. The WTRU of claim 8, further comprising circuitry configured to receive a plurality of periodic DL synchronization sequences on the narrowband air interface and to estimate the range between the WTRU and the base station based on the plurality of periodic DL synchronization sequences.

15. A base station comprising:
   circuitry configured to transmit a periodic downlink (DL) synchronization sequence on a narrowband air interface;
   circuitry configured to, in a first random access channel (RACH) procedure for the narrowband air interface:
      transmit, to a wireless transmit-receive unit (WTRU), information indicating a RACH sequence for a wideband transceiver (WB TRX) and information indicating at least one RACH occasion for a second RACH procedure, wherein the RACH sequence for the WB TRX is based on a molecular absorption characteristic and a range between the WTRU and the base station; and
   circuitry configured to, in the second RACH procedure, receive the RACH sequence for the WB TRX during a first RACH occasion of the at least one RACH occasion for the second RACH procedure.

16. The base station of claim 15, wherein the range is indicated by a field of a RACH message, by a preamble selected from a pool of preambles, or by a RACH occasion selected from a pool of RACH occasions.

17. The base station of claim 15, wherein the first RACH procedure comprises a 4-step RACH procedure or a 2-step RACH procedure.

18. The base station of claim 15, further comprising circuitry configured to receive an indication of the range from the WTRU.

19. The base station of claim 15, wherein the range is an estimate based on the periodic DL synchronization sequence.

20. The base station of claim 15, further comprising circuitry configured to transmit a plurality of periodic DL synchronization sequences on the narrowband air interface to the WTRU, wherein the range is an estimate based on the plurality of periodic DL synchronization sequences.

\* \* \* \* \*